(12) United States Patent
Garrido Lopez et al.

(10) Patent No.: US 11,575,209 B2
(45) Date of Patent: Feb. 7, 2023

(54) ELECTRONIC DEVICES HAVING ANTENNAS FOR COVERING MULTIPLE FREQUENCY BANDS

(71) Applicant: Apple Inc., Cupertino, CA (US)

(72) Inventors: David Garrido Lopez, Campbell, CA (US); Aobo Li, Saratoga, CA (US); Forhad Hasnat, Cupertino, CA (US); Harish Rajagopalan, San Jose, CA (US); Mikal Askarian Amiri, Tempe, AZ (US); Rodney A. Gomez Angulo, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 138 days.

(21) Appl. No.: 16/905,498

(22) Filed: Jun. 18, 2020

(65) Prior Publication Data

US 2021/0399429 A1 Dec. 23, 2021

(51) Int. Cl.
*H01Q 13/18* (2006.01)
*H04B 7/0413* (2017.01)
(Continued)

(52) U.S. Cl.
CPC ............ *H01Q 13/18* (2013.01); *H01Q 5/50* (2015.01); *H01Q 21/005* (2013.01); *H04B 7/0413* (2013.01)

(58) Field of Classification Search
CPC ........ H01Q 1/243; H01Q 1/44; H01Q 1/2266; H01Q 1/38; H01Q 13/18; H01Q 1/245; H01Q 13/10; H01Q 1/24; H01Q 1/42; H01Q 5/378; H01Q 9/42; H01Q 1/48; H01Q 5/42; H01Q 9/0407; H01Q 9/0435; H01Q 21/28; H01Q 21/065; H01Q 9/0414; H01Q 9/30; H01Q 1/52; H01Q 1/523; H01Q 21/30; H01Q 9/045; H01Q 1/22; H01Q 21/061; H01Q 21/22; H01Q 21/24; H01Q 3/26; H01Q 5/328; H01Q 21/064; H01Q 1/526; H01Q 13/103; H01Q 3/2605; H01Q 3/2658; H01Q 9/0421;
(Continued)

(56) References Cited

U.S. PATENT DOCUMENTS 8,665,164 B2 3/2014 Hill et al.
10,164,679 B1 12/2018 Rajagopalan et al.
(Continued)

*Primary Examiner* — Andrea Lindgren Baltzell
(74) *Attorney, Agent, or Firm* — Treyz Law Group, P.C.; Michael H. Lyons; Tianyi He

(57) ABSTRACT

An electronic device may have a first conductive sidewall at an upper end, a second conductive sidewall at a lower end, and a conductive rear wall. First and second antennas may be formed at the upper end and may include slots with edges defined by the first sidewall and the rear wall. Third, fourth, fifth, and sixth antennas may be formed at the lower end and may include slots with edges defined by the second sidewall and the rear wall. Each antenna may cover multiple frequency bands. First order and third order modes of the slots may contribute to the frequency responses of the third through sixth antennas. A display controller may be mounted at the lower end and may impose a lower limit on the frequencies covered by the third through sixth antennas. The first and second antennas may cover lower frequencies than the third through sixth antennas.

20 Claims, 8 Drawing Sheets

(51) Int. Cl.
*H01Q 5/50* (2015.01)
*H01Q 21/00* (2006.01)

(58) Field of Classification Search
CPC .. H01Q 9/0442; H01Q 9/0485; H01Q 1/2258;
H01Q 1/40; H01Q 1/525; H01Q 21/005;
H01Q 21/29; H01Q 5/50; H01Q 7/00;
H01Q 1/2291; H01Q 13/106; H01Q
13/16; H01Q 3/38; H01Q 5/35; H01Q
5/385; H01Q 9/36; H01Q 1/405; H01Q
21/0075; H01Q 5/28; H01Q 5/357; H01Q
1/2283; H01Q 1/241; H01Q 1/422; H01Q
1/50; H01Q 1/521; H01Q 13/06; H01Q
13/24; H01Q 21/00; H01Q 21/08; H01Q
21/245; H01Q 21/26; H01Q 25/00; H01Q
3/2617; H01Q 3/267; H01Q 3/28; H01Q
3/40; H01Q 5/25; H01Q 5/30; H01Q
5/392; H01Q 5/40; H01Q 7/005; H01Q
9/16; H01Q 9/285; H01Q 1/242; H01Q
13/22; H01Q 23/00; H01Q 5/321; H01Q
9/40; H04B 7/0413
See application file for complete search history.

(56) References Cited

U.S. PATENT DOCUMENTS

| | | |
|---|---|---|
| 10,305,171 B1 | 5/2019 | Navarro |
| 10,396,434 B2 | 8/2019 | Koo et al. |
| 10,476,167 B2 | 11/2019 | Vazquez et al. |
| 10,477,675 B1 | 11/2019 | Kim et al. |
| 2015/0222008 A1 | 8/2015 | Cooper |
| 2018/0076529 A1 | 3/2018 | Minard et al. |
| 2019/0097314 A1 | 3/2019 | Rajagopalan et al. |
| 2019/0260112 A1* | 8/2019 | Azad .................... H01Q 9/42 |
| 2019/0379105 A1 | 12/2019 | Sayem et al. |
| 2019/0393586 A1* | 12/2019 | Ayala Vazquez ........ H01Q 1/48 |
| 2020/0099138 A1 | 3/2020 | Lopez et al. |

* cited by examiner

ELECTRONIC DEVICES HAVING ANTENNAS FOR COVERING MULTIPLE FREQUENCY BANDS

BACKGROUND

This relates to electronic devices, and more particularly, to antennas for electronic devices with wireless communications circuitry.

Electronic devices such as portable computers and cellular telephones are often provided with wireless communications capabilities. To satisfy consumer demand for small form factor wireless devices, manufacturers are continually striving to implement wireless communications circuitry such as antenna components using compact structures. At the same time, there is a desire for wireless devices to cover a growing number of communications bands.

Because antennas have the potential to interfere with each other and with components in a wireless device, care must be taken when incorporating antennas into an electronic device. Moreover, care must be taken to ensure that the antennas and wireless circuitry in a device are able to exhibit satisfactory performance over a range of operating frequencies and with a satisfactory efficiency bandwidth. In addition, in some devices a single antenna is used to cover a particular frequency band. However, in these scenarios, a single antenna may exhibit insufficient data throughput, particularly when handling communications for data-intensive device applications.

It would therefore be desirable to be able to provide improved wireless communications circuitry for wireless electronic devices.

SUMMARY

An electronic device may be provided with a housing, a display, and wireless circuitry. The housing may include a conductive rear wall and peripheral conductive housing structures. The peripheral conductive housing structures may include a first sidewall at an upper end of the device and a second sidewall at a lower end of the device. The display may be mounted to the peripheral conductive housing structures. A display controller may be mounted at the lower end of the device for driving the display.

The wireless circuitry may include first and second antennas at the upper end and third, fourth, fifth, and sixth antennas at the lower end of the device. The first and second antennas may include first and second slots with edges defined by the first conductive sidewall and the rear wall. The first and second slots may each have a pair of open ends defined by dielectric gaps in the peripheral conductive housing structures. The first and second antennas may have resonating element arms formed from segments of the first conductive sidewall. The third, fourth, fifth, and sixth antennas may include respective third, fourth, fifth, and sixth slots with edges defined by the second conductive sidewall and the rear wall. The third, fourth, fifth, and sixth slots may each have a single open end defined by dielectric gaps in the peripheral conductive housing structures.

The first and second antennas may each have at least three tunable components. The first and second antennas may convey signals in a cellular low band, a cellular low-midband, a cellular midband, a cellular high band, and a cellular ultra-high band. The second antenna may also convey signals in a 2.4 GHz wireless local area network (WLAN) band and may receive signals in a satellite navigations band. The presence of the display controller at the lower end of the device may prevent the third, fourth, fifth, and sixth antennas from covering the cellular low band or the cellular low-midband. The third, fourth, fifth, and sixth antennas may each include at least one tunable component. First order and/or higher order modes (e.g., third order modes) of the third, fourth, fifth, and sixth antennas may contribute to the frequency responses of the antennas. The third antenna may convey signals in the cellular midband, the cellular ultra-high band, and the 2.4 GHz WLAN band. The fourth and fifth antennas may convey signals in the cellular ultra-high band and a 5 GHz WLAN band. The sixth antenna may convey signals in the cellular midband, the cellular high band, and the 5 GHz WLAN band. Multiple-input and multiple-output (MIMO) schemes may be used by any combination of the antennas in any of these frequency bands to maximize data throughput.

DETAILED DESCRIPTION

Figure 1:
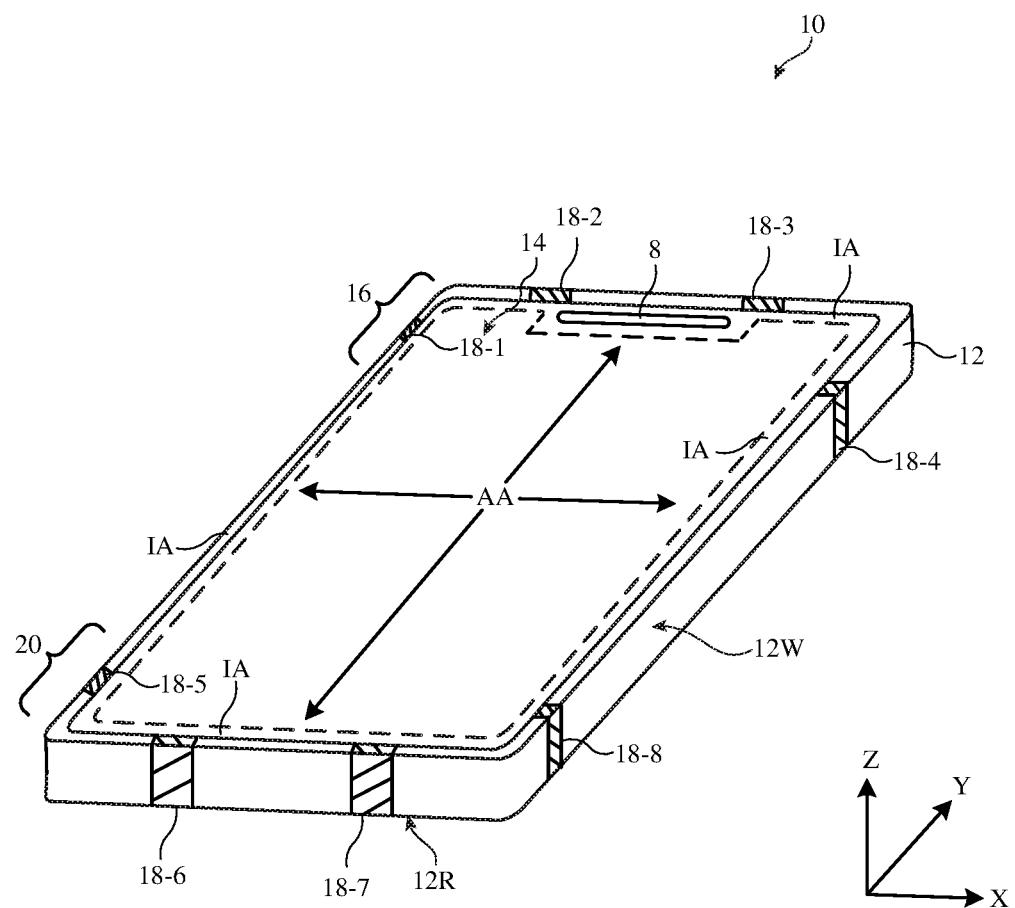
FIG. 1 is a perspective view of an illustrative electronic device in accordance with some embodiments.

An electronic device such as electronic device 10 of FIG. 1 may be provided with wireless circuitry that includes antennas. The antennas may be used to transmit and/or receive wireless radio-frequency signals.

Electronic device 10 may be a portable electronic device or other suitable electronic device. For example, electronic device 10 may be a laptop computer, a tablet computer, a somewhat smaller device such as a wrist-watch device, pendant device, headphone device, earpiece device, or other wearable or miniature device, a handheld device such as a cellular telephone, a media player, or other small portable device. Device 10 may also be a set-top box, a desktop computer, a display into which a computer or other processing circuitry has been integrated, a display without an integrated computer, a wireless access point, wireless base station, an electronic device incorporated into a kiosk, building, or vehicle, or other suitable electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may, if desired, have a display such as display 14. Display 14 may be mounted on the front face of device 10. Display 14 may be a touch screen that incorporates capacitive touch electrodes or may be insensitive to touch. The rear face of housing 12 (i.e., the face of device 10 opposing the front face of device 10) may have a substantially planar housing wall such as rear housing wall 12R (e.g., a planar housing wall). Rear housing wall 12R may have slots that pass entirely through the rear housing wall and that therefore separate portions of housing 12 from each other. Rear housing wall 12R may include conductive portions and/or dielectric portions. If desired, rear housing wall 12R may include a planar metal layer covered by a thin layer or coating of dielectric such as glass, plastic, sapphire, or ceramic. Housing 12 may also have shallow grooves that do not pass entirely through housing 12. The slots and grooves may be filled with plastic or other dielectric. If desired, portions of housing 12 that have been separated from each other (e.g., by a through slot) may be joined by internal conductive structures (e.g., sheet metal or other metal members that bridge the slot).

Housing 12 may include peripheral housing structures such as peripheral structures 12W. Peripheral structures 12W and rear housing wall 12R may sometimes be referred to herein collectively as conductive structures of housing 12. Peripheral structures 12W may run around the periphery of device 10 and display 14. In configurations in which device 10 and display 14 have a rectangular shape with four edges, peripheral structures 12W may be implemented using peripheral housing structures that have a rectangular ring shape with four corresponding edges and that extend from rear housing wall 12R to the front face of device 10 (as an example). Peripheral structures 12W or part of peripheral structures 12W may serve as a bezel for display 14 (e.g., a cosmetic trim that surrounds all four sides of display 14 and/or that helps hold display 14 to device 10) if desired. Peripheral structures 12W may, if desired, form sidewall structures for device 10 (e.g., by forming a metal band with vertical sidewalls, curved sidewalls, etc.).

Peripheral structures 12W may be formed of a conductive material such as metal and may therefore sometimes be referred to as peripheral conductive housing structures, conductive sidewalls, conductive housing structures, peripheral metal structures, peripheral conductive sidewalls, peripheral conductive sidewall structures, conductive housing sidewalls, peripheral conductive housing sidewalls, sidewalls, sidewall structures, or a peripheral conductive housing member (as examples). Peripheral conductive housing structures 12W may be formed from a metal such as stainless steel, aluminum, or other suitable materials. One, two, or more than two separate structures may be used in forming peripheral conductive housing structures 12W.

It is not necessary for peripheral conductive housing structures 12W to have a uniform cross-section. For example, the top portion of peripheral conductive housing structures 12W may, if desired, have an inwardly protruding lip that helps hold display 14 in place. The bottom portion of peripheral conductive housing structures 12W may also have an enlarged lip (e.g., in the plane of the rear surface of device 10). Peripheral conductive housing structures 12W may have substantially straight vertical sidewalls, may have sidewalls that are curved, or may have other suitable shapes. In some configurations (e.g., when peripheral conductive housing structures 12W serve as a bezel for display 14), peripheral conductive housing structures 12W may run around the lip of housing 12 (i.e., peripheral conductive housing structures 12W may cover only the edge of housing 12 that surrounds display 14 and not the rest of the sidewalls of housing 12).

If desired, rear housing wall 12R may be formed from a metal such as stainless steel or aluminum and may sometimes be referred to herein as conductive rear housing wall 12R or conductive rear wall 12R. Conductive rear housing wall 12R may lie in a plane that is parallel to display 14. In configurations for device 10 in which the rear housing wall is formed from metal, it may be desirable to form parts of peripheral conductive housing structures 12W as integral portions of the housing structures forming the conductive rear housing wall of housing 12. For example, conductive rear housing wall 12R of device 10 may be formed from a planar metal structure and portions of peripheral conductive housing structures 12W on the sides of housing 12 may be formed as flat or curved vertically extending integral metal portions of the planar metal structure (e.g., housing structures 12R and 12W may be formed from a continuous piece of metal in a unibody configuration). Housing structures such as these may, if desired, be machined from a block of metal and/or may include multiple metal pieces that are assembled together to form housing 12. Conductive rear housing wall 12R may have one or more, two or more, or three or more portions. Peripheral conductive housing structures 12W and/or the conductive rear housing wall 12R may form one or more exterior surfaces of device 10 (e.g., surfaces that are visible to a user of device 10) and/or may be implemented using internal structures that do not form exterior surfaces of device 10 (e.g., conductive housing structures that are not visible to a user of device 10 such as conductive structures that are covered with layers such as thin cosmetic layers, protective coatings, and/or other coating layers that may include dielectric materials such as glass, ceramic, plastic, or other structures that form the exterior surfaces of device 10 and/or serve to hide structures 12W and/or 12R from view of the user).

Display 14 may have an array of pixels that form an active area AA that displays images for a user of device 10. For example, active area AA may include an array of display pixels. The array of pixels may be formed from liquid crystal display (LCD) components, an array of electrophoretic pixels, an array of plasma display pixels, an array of organic light-emitting diode display pixels or other light-emitting diode pixels, an array of electrowetting display pixels, or display pixels based on other display technologies. If desired, active area AA may include touch sensors such as touch sensor capacitive electrodes, force sensors, or other sensors for gathering a user input.

Display 14 may have an inactive border region that runs along one or more of the edges of active area AA. Inactive area IA may be free of pixels for displaying images and may overlap circuitry and other internal device structures in housing 12. To block these structures from view by a user of device 10, the underside of the display cover layer or other layers in display 14 that overlap inactive area IA may be coated with an opaque masking layer in inactive area IA. The opaque masking layer may have any suitable color.

Display 14 may be protected using a display cover layer such as a layer of transparent glass, clear plastic, transparent ceramic, sapphire, or other transparent crystalline material, or other transparent layer(s). The display cover layer may have a planar shape, a convex curved profile, a shape with planar and curved portions, a layout that includes a planar main area surrounded on one or more edges with a portion that is bent out of the plane of the planar main area, or other suitable shapes. The display cover layer may cover the entire front face of device 10. In another suitable arrangement, the display cover layer may cover substantially all of the front face of device 10 or only a portion of the front face of device 10. Openings may be formed in the display cover layer. For example, an opening may be formed in the display cover layer to accommodate a button. An opening may also be formed in the display cover layer to accommodate ports such as speaker port 8 or a microphone port. Speaker port 8 may be omitted if desired. Openings may be formed in housing 12 to form communications ports (e.g., an audio jack port, a digital data port, etc.) and/or audio ports for audio components such as a speaker and/or a microphone if desired.

Display 14 may include a display module having conductive structures such as an array of capacitive electrodes for a touch sensor, conductive lines for addressing pixels, driver circuits, etc. Housing 12 may include internal conductive structures such as metal frame members and a planar conductive housing member (sometimes referred to as a backplate) that spans the walls of housing 12 (e.g., a substantially rectangular sheet formed from one or more metal parts that is welded or otherwise connected between opposing sides of peripheral conductive housing structures 12W). Conductive rear housing wall 12R may, for example form the backplate of housing 12. The backplate may form an exterior rear surface of device 10 or may be covered by layers such as thin cosmetic layers, protective coatings, and/or other coatings that may include dielectric materials such as glass, ceramic, plastic, or other structures that form the exterior surfaces of device 10 and/or serve to hide the backplate from view of the user. Device 10 may also include conductive structures such as printed circuit boards, components mounted on printed circuit boards, and other internal conductive structures. These conductive structures, which may be used in forming a ground plane in device 10, may extend under active area AA of display 14, for example.

At ends (regions) 16 and 20, openings may be formed within the conductive structures of device 10 (e.g., between peripheral conductive housing structures 12W and opposing conductive ground structures such as conductive portions of conductive rear housing wall 12R, conductive traces on a printed circuit board, conductive electrical components in display 14, etc.). These openings, which may sometimes be referred to as gaps, may be filled with air, plastic, and/or other dielectrics and may be used in forming slot antenna resonating elements for one or more antennas in device 10, if desired.

Conductive housing structures and other conductive structures in device 10 may serve as a ground plane for the antennas in device 10. The openings in ends 20 and 16 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element from the ground plane, may contribute to the performance of a parasitic antenna resonating element, or may otherwise serve as part of antenna structures formed in ends 20 and 16. If desired, the ground plane that is under active area AA of display 14 and/or other metal structures in device 10 may have portions that extend into parts of the ends of device 10 (e.g., the ground may extend towards the dielectric-filled openings in ends 20 and 16), thereby narrowing the slots in ends 20 and 16.

In general, device 10 may include any suitable number of antennas (e.g., one or more, two or more, three or more, four or more, etc.). The antennas in device 10 may be located at opposing first and second ends of an elongated device housing (e.g., at ends 20 and 16 of device 10 of FIG. 1), along one or more edges of a device housing, in the center of a device housing, in other suitable locations, or in one or more of these locations. The arrangement of FIG. 1 is merely illustrative.

Portions of peripheral conductive housing structures 12W may be provided with peripheral gap structures. For example, peripheral conductive housing structures 12W may be provided with one or more gaps 18 such as gaps 18-1, 18-2, 18-3, 18-4, 18-5, 18-6, 18-7, and 18-8, as shown in FIG. 1. The gaps in peripheral conductive housing structures 12W may be filled with dielectric such as polymer, ceramic, glass, air, other dielectric materials, or combinations of these materials. The gaps may divide peripheral conductive housing structures 12W into one or more peripheral conductive segments. There may be, for example, two peripheral conductive segments in peripheral conductive housing structures 12W (e.g., in an arrangement with two gaps 18), three peripheral conductive segments (e.g., in an arrangement with three gaps 18), four peripheral conductive segments (e.g., in an arrangement with four gaps 18), six peripheral conductive segments (e.g., in an arrangement with six gaps 18), eight peripheral conductive segments (e.g., in an arrangement with eight gaps 18), etc. The segments of peripheral conductive housing structures 12W that are formed in this way may form parts of antennas in device 10.

The gaps in peripheral conductive housing structures 12W may be formed along different sides of device 10. In the example of FIG. 1, device 10 has a substantially rectangular outline. Peripheral conductive housing structures 12W include a first conductive sidewall at a first (e.g., left) edge of device 10, a second conductive sidewall at a second (e.g., top) edge of device 10, a third conductive sidewall at a third (e.g., right) edge of device 10, and a fourth conductive sidewall at a fourth (e.g., bottom) edge of device 10 (e.g., where the first conductive sidewall extends parallel to the third conductive sidewall and the Y-axis and where the second and fourth conductive sidewalls extend in parallel between the first and third conductive sidewalls). Gaps 18-5 and 18-1 may be formed in the first conductive sidewall. Gaps 18-2 and 18-3 may be formed in the second conductive sidewall. Gaps 18-4 and 18-8 may be formed in the third conductive sidewall. Gaps 18-6 and 18-7 may be formed in the fourth conductive sidewall. Gaps 18-1, 18-2, 18-3, and 18-4 may be formed in peripheral conductive housing structures 12W at upper end 16 of device 10. Gaps 18-5, 18-6, 18-7, and 18-8 may be formed in peripheral conductive housing structures 12W at lower end 20 of device 10. This example is merely illustrative.

If desired, openings in housing 12 such as grooves that extend partway or completely through housing 12 may extend across the width of the rear wall of housing 12 and may penetrate through the rear wall of housing 12 to divide the rear wall into different portions. These grooves may also extend into peripheral conductive housing structures 12W and may form antenna slots, gaps 18, and other structures in device 10. Polymer or other dielectric may fill these grooves and other housing openings. In some situations, housing openings that form antenna slots and other structures may be filled with a dielectric such as air.

In a typical scenario, device 10 may have one or more upper antennas and one or more lower antennas (as an example). An upper antenna may, for example, be formed at upper end 16 of device 10. A lower antenna may, for example, be formed at lower end 20 of device 10. The antennas may be used separately to cover identical communications bands, overlapping communications bands, or separate communications bands. The antennas may be used to implement an antenna diversity scheme or a multiple-input-multiple-output (MIMO) antenna scheme. Antennas in device 10 may be used to support any communications bands of interest. For example, device 10 may include antenna structures for supporting local area network communications, voice and data cellular telephone communications, global positioning system (GPS) communications or other satellite navigation system communications, Bluetooth® communications, near-field communications, ultra-wideband communications, etc.

In order to provide an end user of device 10 with as large of a display as possible (e.g., to maximize an area of the device used for displaying media, running applications, etc.), it may be desirable to increase the amount of area at the front face of device 10 that is covered by active area AA of display 14. Increasing the size of active area AA may reduce the size of inactive area IA within device 10. This may reduce the area of ends 20 and 16 that is available for forming antennas within device 10. In general, antennas that are provided with larger operating volumes or spaces may have higher bandwidth efficiency than antennas that are provided with smaller operating volumes or spaces. If care is not taken, increasing the size of active area AA may reduce the operating space available to the antennas, which can undesirably inhibit the efficiency bandwidth of the antennas (e.g., such that the antennas no longer exhibit satisfactory radio-frequency performance). It would therefore be desirable to be able to provide antennas that occupy a small amount of space within device 10 (e.g., to allow for as large of a display active area AA as possible) while still allowing the antennas to operate with optimal efficiency bandwidth.

Figure 2:
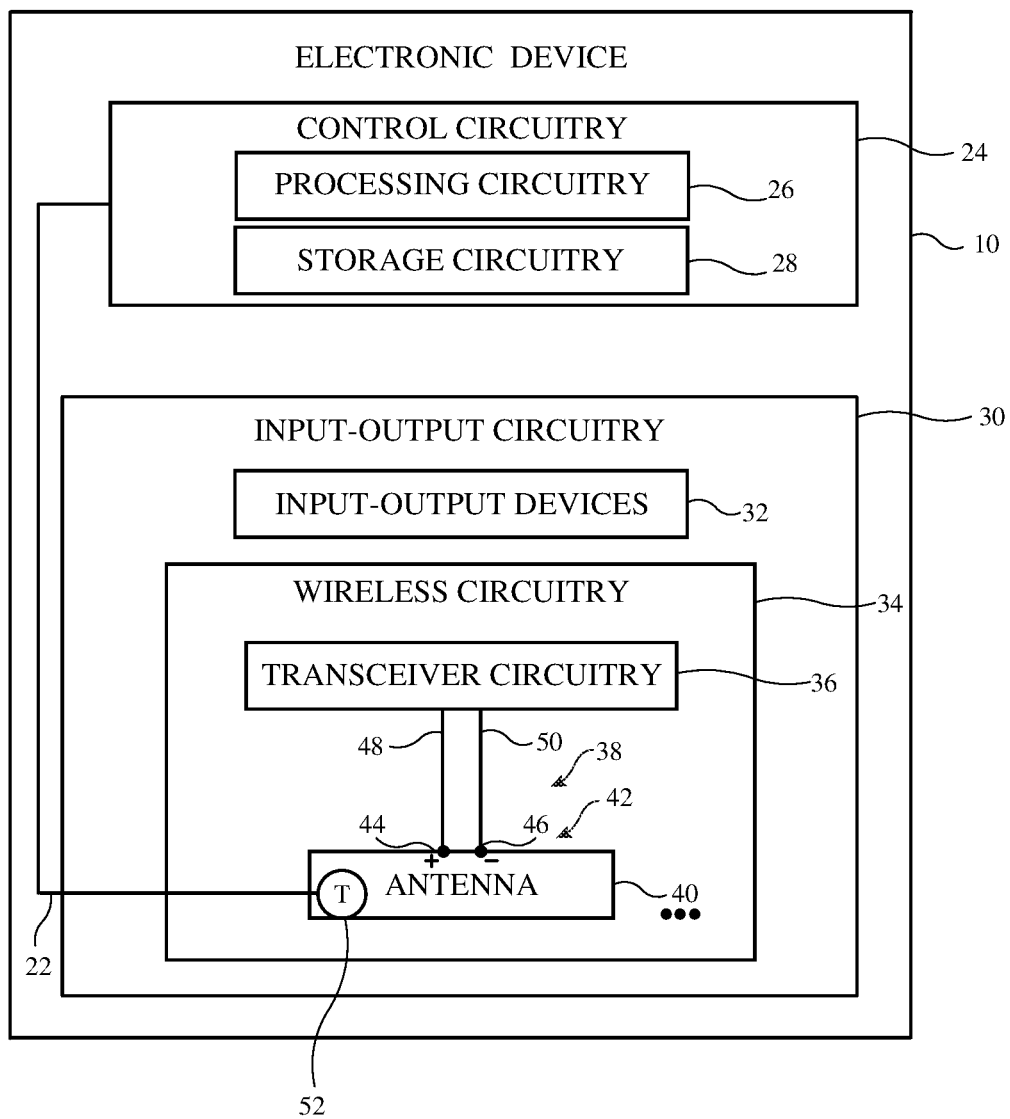
FIG. 2 is a schematic diagram of illustrative circuitry in an electronic device in accordance with some embodiments.

A schematic diagram of illustrative components that may be used in device 10 is shown in FIG. 2. As shown in FIG. 2, device 10 may include control circuitry 24. Control circuitry 24 may include storage such as storage circuitry 28. Storage circuitry 28 may include hard disk drive storage, nonvolatile memory (e.g., flash memory or other electrically-programmable-read-only memory configured to form a solid-state drive), volatile memory (e.g., static or dynamic random-access-memory), etc.

Control circuitry 24 may include processing circuitry such as processing circuitry 26. Processing circuitry 26 may be used to control the operation of device 10. Processing circuitry 26 may include on one or more microprocessors, microcontrollers, digital signal processors, host processors, baseband processor integrated circuits, application specific integrated circuits, central processing units (CPUs), etc. Control circuitry 24 may be configured to perform operations in device 10 using hardware (e.g., dedicated hardware or circuitry), firmware, and/or software. Software code for performing operations in device 10 may be stored on storage circuitry 28 (e.g., storage circuitry 28 may include non-transitory (tangible) computer readable storage media that stores the software code). The software code may sometimes be referred to as program instructions, software, data, instructions, or code. Software code stored on storage circuitry 28 may be executed by processing circuitry 26.

Control circuitry 24 may be used to run software on device 10 such as satellite navigation applications, internet browsing applications, voice-over-internet-protocol (VOIP) telephone call applications, email applications, media playback applications, operating system functions, etc. To support interactions with external equipment, control circuitry 24 may be used in implementing communications protocols. Communications protocols that may be implemented using control circuitry 24 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols, cellular telephone protocols, MIMO protocols, antenna diversity protocols, satellite navigation system protocols (e.g., global positioning system (GPS) protocols, global navigation satellite system (GLONASS) protocols, etc.), or any other desired communications protocols. Each communications protocol may be associated with a corresponding radio access technology (RAT) that specifies the physical connection methodology used in implementing the protocol.

Device 10 may include input-output circuitry 30. Input-output circuitry 30 may include input-output devices 32. Input-output devices 32 may be used to allow data to be supplied to device 10 and to allow data to be provided from device 10 to external devices. Input-output devices 32 may include user interface devices, data port devices, and other input-output components. For example, input-output devices 32 may include touch sensors, displays (e.g., touch-sensitive displays), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), etc. In some configurations, keyboards, headphones, displays, pointing devices such as trackpads, mice, and joysticks, and other input-output devices may be coupled to device 10 using wired or wireless connections (e.g., some of input-output devices 32 may be peripherals that are coupled to a main processing unit or other portion of device 10 via a wired or wireless link).

Input-output circuitry 30 may include wireless circuitry 34 to support wireless communications. Wireless circuitry 34 may include radio-frequency (RF) transceiver circuitry 36 formed from one or more integrated circuits, power amplifier circuitry, low-noise input amplifiers, passive RF components, one or more antennas such as antenna 40, transmission lines such as transmission line 38, and other circuitry for handling RF wireless signals. Wireless signals can also be sent using light (e.g., using infrared communications). While control circuitry 24 is shown separately from wireless circuitry 34 in the example of FIG. 1 for the sake of clarity, wireless circuitry 34 may include processing circuitry that forms a part of processing circuitry 26 and/or storage circuitry that forms a part of storage circuitry 28 of control circuitry 24 (e.g., portions of control circuitry 24 may be implemented on wireless circuitry 34). As an example, control circuitry 24 (e.g., processing circuitry 26) may include baseband processor circuitry or other control components that form a part of wireless circuitry 34.

Radio-frequency transceiver circuitry 36 may include wireless local area network transceiver circuitry that handles WLAN communications bands (e.g., Wi-Fi® (IEEE 802.11) or other WLAN communications bands) such as a 2.4 GHz WLAN band (e.g., from 2400 to 2480 MHz) and a 5 GHz WLAN band (e.g., from 5180 to 5825 MHz). Radio-frequency transceiver circuitry 36 may also include wireless personal area network transceiver circuitry that handles the 2.4 GHz Bluetooth® band or other WPAN communications bands. If desired, radio-frequency transceiver circuitry 36 may handle other bands such as cellular telephone bands, near-field communications bands (e.g., at 13.56 MHz), satellite navigations bands (e.g., a GPS band from 1565 to 1610 MHz), millimeter or centimeter wave bands (e.g., from 10 to 300 GHz), and/or other communications bands. The cellular telephone bands handled by radio-frequency transceiver circuitry 36 may include a cellular low band (LB) (e.g., from 600 to 960 MHz), a cellular low-midband at higher frequencies than the cellular low band (e.g., from 1400 to 1550 MHz), a cellular midband at higher frequencies than the cellular low-midband (e.g., from 1565 to 1610 MHz), a cellular high band at higher frequencies than the cellular midband (e.g., from 2300 to 2700 MHz), and/or a cellular ultra-high band at higher frequencies than the cellular high band (e.g., from 3400 to 3800 MHz). If desired, radio-frequency transceiver circuitry 36 may also include ultra-wideband (UWB) transceiver circuitry that supports communications using the IEEE 802.15.4 protocol and/or other ultra-wideband communications protocols. Communications bands may sometimes be referred to herein as frequency bands or simply as "bands" and may span corresponding ranges of frequencies.

Wireless circuitry 34 may include one or more antennas such as antenna 40. In general, radio-frequency transceiver circuitry 36 may be configured to cover (handle) any suitable communications (frequency) bands of interest. Radio-frequency transceiver circuitry 36 may convey radio-frequency signals using antennas 40 (e.g., antennas 40 may convey the radio-frequency signals for radio-frequency transceiver circuitry 36). The term "convey radio-frequency signals" as used herein means the transmission and/or reception of the radio-frequency signals (e.g., for performing unidirectional and/or bidirectional wireless communications with external wireless communications equipment). Antennas 40 may transmit the radio-frequency signals by radiating the radio-frequency signals into free space (or to freespace through intervening device structures such as a dielectric cover layer). Antennas 40 may additionally or alternatively receive the radio-frequency signals from free space (e.g., through intervening devices structures such as a dielectric cover layer). The transmission and reception of radio-frequency signals by antennas 40 each involve the excitation or resonance of antenna currents on an antenna resonating element in the antenna by the radio-frequency signals within the frequency band(s) of operation of the antenna.

As shown in FIG. 2, radio-frequency transceiver circuitry 36 may be coupled to antenna feed 42 of antenna 40 using transmission line 38. Antenna feed 42 may include a positive antenna feed terminal such as positive antenna feed terminal 44 and may include a ground antenna feed terminal such as ground antenna feed terminal 46. Transmission line 38 may be formed from metal traces on a printed circuit, cables, or other conductive structures. Transmission line 38 may have a positive transmission line signal path such as path 48 that is coupled to positive antenna feed terminal 44. Transmission line 38 may have a ground transmission line signal path such as path 50 that is coupled to ground antenna feed terminal 46. Path 48 may sometimes be referred to herein as signal conductor 48 and path 50 may sometimes be referred to herein as ground conductor 50.

Transmission line paths such as transmission line 38 may be used to route antenna signals within device 10 (e.g., to convey radio-frequency signals between radio-frequency transceiver circuitry 36 and antenna feed 42 of antenna 40). Transmission lines in device 10 may include coaxial cables, microstrip transmission lines, stripline transmission lines, edge-coupled microstrip transmission lines, edge-coupled stripline transmission lines, transmission lines formed from combinations of transmission lines of these types, etc. Transmission lines in device 10 such as transmission line 38 may be integrated into rigid and/or flexible printed circuit boards. In one suitable arrangement, transmission lines such as transmission line 38 may also include transmission line conductors (e.g., signal conductors 48 and ground conductors 50) integrated within multilayer laminated structures (e.g., layers of a conductive material such as copper and a dielectric material such as a resin that are laminated together without intervening adhesive). The multilayer laminated structures may, if desired, be folded or bent in multiple dimensions (e.g., two or three dimensions) and may maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive).

To provide antenna structures such as antenna 40 with the ability to cover communications frequencies of interest, antenna 40 may be provided with circuitry such as filter circuitry (e.g., one or more passive filters and/or one or more tunable filter circuits). Discrete components such as capacitors, inductors, and resistors may be incorporated into the filter circuitry. Capacitive structures, inductive structures, and resistive structures may also be formed from patterned metal structures (e.g., part of an antenna). If desired, antenna 40 may be provided with adjustable circuits such as tunable (T) components 52 to tune the antenna over frequency band(s) of interest. Tunable components 52 may be part of a tunable filter or tunable impedance matching network, may be part of an antenna resonating element, may span a gap between an antenna resonating element and antenna ground, etc.

Tunable components 52 may include tunable inductors, tunable capacitors, or other tunable components. Tunable components such as these may be based on switches and networks of fixed components, distributed metal structures that produce associated distributed capacitances and inductances, variable solid state devices for producing variable capacitance and inductance values, tunable filters, or other suitable tunable structures. During operation of device 10, control circuitry 24 may issue control signals on one or more paths such as path 22 that adjust inductance values, capacitance values, or other parameters associated with tunable components 52, thereby tuning antenna 40 to cover desired communications bands. A matching network (e.g., an adjustable matching network formed using tunable components 52) may include components such as inductors, resistors, and capacitors used in matching the impedance of antenna 40 to the impedance of transmission line 38. Matching network components may be provided as discrete components (e.g., surface mount technology components) or may be formed from housing structures, printed circuit board structures, traces on plastic supports, etc. Components such as these may also be used in forming filter circuitry in antenna 40 and may be tunable and/or fixed components.

During operation, control circuitry 24 may use radio-frequency transceiver circuitry 36 and antenna(s) 40 to transmit and/or receive data wirelessly. Control circuitry 24 may, for example, receive wireless local area network communications wirelessly using radio-frequency transceiver circuitry 36 and antenna(s) 40 and may transmit wireless local area network communications wirelessly using radio-frequency transceiver circuitry 36 and antenna(s) 40.

Control circuitry 24 may use information from a proximity sensor (e.g., sensors in input-output devices 32), wireless performance metric data such as received signal strength information, device orientation information from an orientation sensor, device motion data from an accelerometer or other motion detecting sensor, information about a usage scenario of device 10, information about whether audio is being played through a speaker, information from one or more antenna impedance sensors, and/or other information in determining when antenna 40 is being affected by the presence of nearby external objects or is otherwise in need of tuning. In response, control circuitry 24 may adjust an adjustable inductor, adjustable capacitor, switch, or other tunable component 52 and/or may switch one or more antennas 40 into or out of use to ensure that wireless circuitry 34 operates as desired.

The presence or absence of external objects such as a user's hand may affect antenna loading and therefore antenna performance. Antenna loading may differ depending on the way in which device 10 is being held. For example, antenna loading and therefore antenna performance may be affected in one way when a user is holding device 10 in a portrait orientation and may be affected in another way when a user is holding device 10 in a landscape orientation. To accommodate various loading scenarios, device 10 may use sensor data, antenna measurements, information about the usage scenario or operating state of device 10, and/or other data from input-output devices 32 to monitor for the presence of antenna loading (e.g., the presence of a user's hand, the user's head, or another external object). Device 10 (e.g., control circuitry 24) may then adjust tunable components 52 in antenna 40 and/or may switch other antennas into or out of use to compensate for the loading (e.g., multiple antennas 40 may be operated using a diversity protocol to ensure that at least one antenna 40 may maintain satisfactory communications even while the other antennas are blocked by external objects). Adjustments to tunable components 52 may also be made to extend the coverage of antenna structures 40 (e.g., to cover desired communications bands that extend over a range of frequencies larger than the antenna structures would cover without tuning).

In the example of FIG. 2, a single antenna is shown. When operating using a single antenna, a single stream of wireless data may be conveyed between device 10 and external communications equipment (e.g., one or more other wireless devices such as wireless base stations, access points, cellular telephones, computers, etc.). This may impose an upper limit on the data rate (data throughput) obtainable by wireless circuitry 34 in communicating with the external communications equipment. As software applications and other device operations increase in complexity over time, the amount of data that needs to be conveyed between device 10 and the external communications equipment typically increases, such that a single antenna may not be capable of providing sufficient data throughput for handling the desired device operations.

In order to increase the overall data throughput of wireless circuitry 34, multiple antennas may be operated using a multiple-input and multiple-output (MIMO) scheme. When operating using a MIMO scheme, two or more antennas on device 10 may be used to convey multiple independent streams of wireless data at the same frequencies. This may significantly increase the overall data throughput between device 10 and the external communications equipment relative to scenarios where only a single antenna is used. In general, the greater the number of antennas that are used for conveying wireless data under the MIMO scheme, the greater the overall throughput of wireless circuitry 34.

Figure 3:
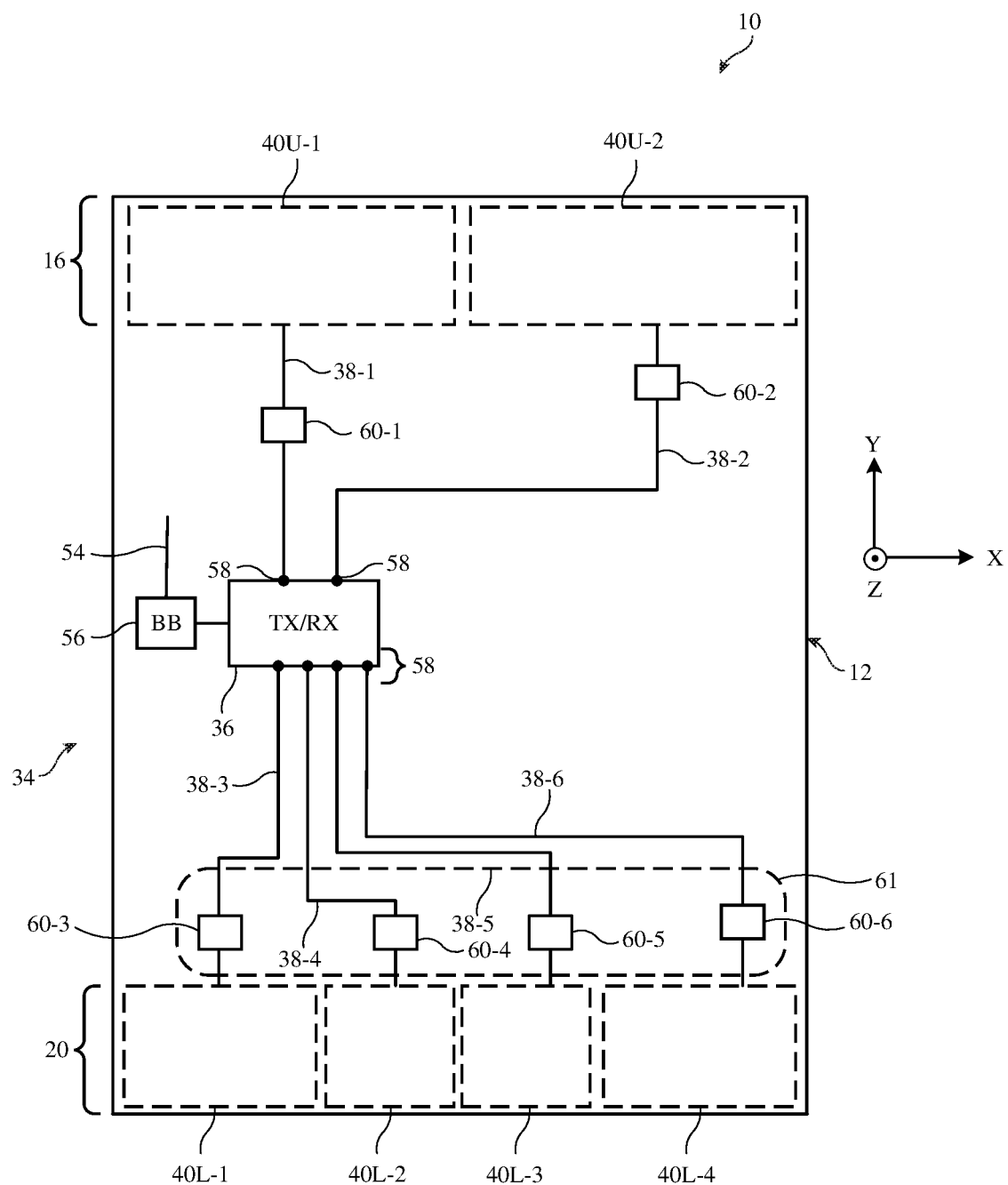
FIG. 3 is a diagram of illustrative wireless circuitry including multiple antennas at different ends of an electronic device accordance with some embodiments.

FIG. 3 is a diagram showing how device 10 may include multiple antennas 40 for performing wireless communications (e.g., using a MIMO scheme). As shown in FIG. 3, device 10 may include two or more antennas 40 such as a first antenna 40U-1, a second antenna 40U-2, a third antenna 40L-1, a fourth antenna 40L-2, a fifth antenna 40L-3, and a sixth antenna 40L-4. This example is merely illustrative and, in general, device 10 may include nay desired number of antennas 40.

Antennas 40 may be provided at different locations within housing 12 of device 10. For example, antennas 40U-1 and 40U-2 may be formed at upper end 16 whereas antennas 40L-1, 40L-2, 40L-3, and 40L-4 are formed at lower end 20. Antennas 40U-1 and 40U-2 may therefore sometimes be referred to herein as upper antennas 40U-1 and 40U-2 (or collectively as upper antennas 40U), whereas antennas 40L-1, 40L-2, 40L-3, and 40L-4 may sometimes be referred to herein as lower antennas 40L-1, 40L-2, 40L-4, and 40L-4 (or collectively as lower antennas 40L).

Wireless circuitry 34 may include input-output ports such as port 54 for interfacing with digital data circuits in storage and processing circuitry (e.g., control circuitry 24 of FIG. 2). Wireless circuitry 34 may include baseband circuitry such as baseband (BB) processor 56 and radio-frequency transceiver circuitry such as transceiver (TX/RX) circuitry 36. Port 54 may receive digital data from the control circuitry that is to be transmitted by transceiver circuitry 36. Incoming data that has been received by transceiver circuitry 36 and baseband processor 56 may be supplied to the control circuitry via port 54.

Transceiver circuitry 36 may include one or more discrete transmitters and one or more discrete receivers if desired. Transceiver circuitry 36 may include multiple transceiver ports 58 that are each coupled to a corresponding transmission line 38 (e.g., a first transmission line 38-1, a second transmission line 38-2, a third transmission line 38-3, a fourth transmission line 38-4, a fifth transmission line 38-5, and a sixth transmission line 38-6). Transmission line 38-1 may couple a first transceiver port 58 of transceiver circuitry 36 to upper antenna 40U-1.

Transmission line 38-2 may couple a second transceiver port 58 to upper antenna 40U-2. Similarly, transmission lines 38-3, 38-4, 38-5, and 38-6 may couple corresponding transceiver ports 58 of transceiver circuitry 36 to lower antennas 40L-1, 40L-2, 40L-3, and 40L-4, respectively.

Radio-frequency front end circuits 60 may be interposed on each transmission line 38 (e.g., a first front end circuit 60-1 may be interposed on transmission line 38-1, a second front end circuit 60-2 may be interposed on transmission line 38-2, a third front end circuit 60-3 may be interposed on transmission line 38-3, etc.). Front end circuits 60 may each include switching circuitry, filter circuitry (e.g., duplexer and/or diplexer circuitry, notch filter circuitry, low pass filter circuitry, high pass filter circuitry, bandpass filter circuitry, etc.), impedance matching circuitry for matching the impedance of transmission line 38 to the corresponding antenna 40, networks of active and/or passive components such as tunable components 52 of FIG. 2, radio-frequency coupler circuitry for gathering antenna impedance measurements, or any other desired radio-frequency circuitry. If desired, front end circuits 60 may include switching circuitry that is configured to selectively couple antennas 40U-1, 40U-2, 40L-1, 40L-2, 40L-3, and 40L-4 to different respective transceiver ports 58 (e.g., so that each antenna can handle communications for different transceiver ports 58 over time based on the state of the switching circuits in front end circuits 60).

If desired, front end circuits 60 may include filtering circuitry (e.g., duplexers and/or diplexers) that allow the corresponding antenna to transmit and receive radio-frequency signals at the same time (e.g., using a frequency domain duplexing (FDD) scheme). Antennas 40U-1, 40U-2, 40L-1, 40L-2, 40L-3, and 40L-4 may transmit and/or receive radio-frequency signals in respective time slots or two or more of antennas 40U-1, 40U-2, 40L-1, 40L-2, 40L-3, and 40L-4 may transmit and/or receive radio-frequency signals concurrently. In general, any desired combination of antennas may transmit and/or receive radio-frequency signals at a given time.

Amplifier circuitry such as one or more power amplifiers may be interposed on transmission lines 38 and/or formed within transceiver circuitry 36 for amplifying radio-frequency signals output by transceiver circuitry 36 prior to transmission over antennas 40. Amplifier circuitry such as one or more low noise amplifiers may be interposed on transmission lines 38 and/or formed within transceiver circuitry 36 for amplifying radio-frequency signals received by antennas 40 prior to conveying the received signals to transceiver circuitry 36.

In the example of FIG. 3, separate front end circuits 60 are formed on each transmission line 38. This is merely illustrative. If desired, two or more transmission lines 38 may share the same front end circuits 60 (e.g., front end circuits 60 may be formed on the same substrate, module, or integrated circuit).

Transceiver circuitry 36 may, for example, include circuitry for converting baseband signals received from baseband processor 56 into corresponding radio-frequency signals. For example, transceiver circuitry 36 may include mixer circuitry for up-converting the baseband signals to radio-frequencies prior to transmission over antennas 40. Transceiver circuitry 36 may include digital to analog converter (DAC) and/or analog to digital converter (ADC) circuitry for converting signals between digital and analog domains. Transceiver circuitry 36 may include circuitry for converting radio-frequency signals received from antennas 40 over transmission lines 38 into corresponding baseband signals. For example, transceiver circuitry 36 may include mixer circuitry for down-converting the radio-frequency signals to baseband frequencies prior to conveying the baseband signals to baseband processor 56. Baseband processor 56, front end circuits 60, and/or transceiver circuitry 36 may be formed on the same substrate, integrated circuit, integrated circuit package, or module or two or more of these components may be formed on separate substrates, integrated circuits, integrated circuit packages, or modules.

Device 10 may include display controller circuitry such as display controller 61. Display controller 61 may be used in controlling display 14 of device 10 (FIG. 1). For example, display controller 61 may drive pixel circuitry in the display to emit images using the display. Display controller 61 may also include touch sensor circuitry that gathers touch sensor data from the display. Display controller circuitry 61 may be implemented on an integrated circuit chip or printed circuit board, as examples. One or more display flexible printed circuits may couple display controller 61 to the display.

Display controller 61 may be located at or adjacent to lower end 20 of device 10 (e.g., display controller 61 may be located adjacent to lower antennas 40L-1, 40L-2, 40L-3, and 40L-4, with some or all of display controller 61 overlapping lower end 20 of device 10). In general, greater antenna volumes support operations at longer wavelengths (lower frequencies). However, display controller 61 may occupy a relatively large amount of space in device 10. The presence of display controller 61 may limit the volume of lower antennas 40L-1, 40L-2, 40L-3, and 40L-4 such that display controller 61 imposes a lower limit on the frequencies coverable by the lower antennas. This may, for example, prevent lower antennas 40L-1, 40L-2, 40L-3, and 40L-4 from being able to cover relatively low frequencies such as frequencies within the cellular low band and/or the cellular low-midband.

Because display controller 61 is located at the opposite side of device 10 from upper antennas 40U-1 and 40U-2, upper antennas 40U-1 and 40U-2 may each occupy a larger space (e.g., a larger area or volume within device 10) than lower antennas 40L-1, 40L-2, 40L-3, and 40L-4. This may allow upper antennas 40U-1 and 40U-2 to support communications at longer wavelengths (i.e., lower frequencies) than lower antennas 40L-1, 40L-2, 40L-3, and 40L-4. Upper antennas 40U-1 and 40U-2 may, for example, each cover the cellular low band and the cellular low-midband. This is merely illustrative and, if desired, each of the antennas may occupy the same volume or may occupy different volumes. Antennas 40U-1, 40U-2, 40L-1, 40L-2, 40L-3, and/or 40L-4 may be configured to convey radio-frequency signals in at least one common frequency band. If desired, one or more of antennas 40U-1, 40U-2, 40L-1, 40L-2, 40L-3, and 40L-4 may handle radio-frequency signals in at least one frequency band that is not covered by one or more of the other antennas in device 10.

If desired, each antenna 40 may handle radio-frequency communications in multiple frequency bands (e.g., multiple cellular telephone communications and/or WLAN bands). In one suitable arrangement that is sometimes described herein as an example, the cellular low band and cellular low-midband may be covered by upper antennas 40U-1 and 40U-2, the GPS band may be covered by upper antenna 40U-2, the cellular midband and cellular high band may be covered by antennas 40U-1, 40U-2, 40L-1, and 40L-4, the 2.4 GHz WLAN band and the 2.4 GHz WPAN band may be covered by antennas 40U-2 and 40L-1, the cellular ultra-high band may be covered by antennas 40U-1, 40U-2, 40L-2, and 40L-3, and the 5 GHz WLAN band may be covered by lower antennas 40L-2, 40L-3, and 40L-4. This is merely illustrative. In general, antennas 40 may cover any desired frequency bands. Device 10 may include any desired number of antennas 40. Housing 12 may have any desired shape.

In order to perform wireless communications under a MIMO scheme, antennas 40 need to convey data at the same frequencies. If desired, wireless circuitry 34 may perform so-called two-stream (2×) MIMO operations (sometimes referred to herein as 2×MIMO communications or communications using a 2×MIMO scheme) in which two antennas 40 are used to convey two independent streams of radio-frequency signals at the same frequency. Wireless circuitry 34 may perform so-called four-stream (4×) MIMO operations (sometimes referred to herein as 4×MIMO communications or communications using a 4×MIMO scheme) in which four antennas 40 are used to convey four independent streams of radio-frequency signals at the same frequency. Performing 4×MIMO operations may support higher overall data throughput than 2×MIMO operations because 4×MIMO operations involve four independent wireless data streams whereas 2×MIMO operations involve only two independent wireless data streams. If desired, upper antennas 40U-1 and 40U-2 may perform 2×MIMO operations in the cellular low band and cellular low-midband, antennas 40U-1, 40U-2, 40L-1, and 40L-4 may perform up to 4×MIMO operations in the cellular midband and the cellular high band, antennas 40U-2 and 40L-1 may perform 2×MIMO operations in the 2.4 GHz WLAN band, antennas 40U-1, 40U-2, 40L-2, and 40L-3 may perform up to 4×MIMO operations in the cellular ultra-high band, and lower antennas 40L-2, 40L-3, and/or 40L-4 may perform 2×MIMO operations in the 5 GHz WLAN band. In this way, antennas 40 may perform MIMO operations to greatly increase the possible data throughput of wireless circuitry 34.

Antennas 40 (e.g., antennas 40U-1, 40U-2, 40L-1, 40L-2, 40L-3, and/or 40L-4 of FIG. 3) may include slot antenna structures (e.g., open slot antenna structures or closed slot antenna structures), inverted-F antenna structures (e.g., planar and non-planar inverted-F antenna structures), loop antenna structures, combinations of these, or any other desired antenna structures. In one suitable arrangement that is described herein as an example, each of upper antennas 40U-1 and 40U-2 may be formed using inverted-F antenna structures. Antennas that are implemented using inverted-F antenna structures may sometimes be referred to herein as inverted-F antennas.

Figure 4:
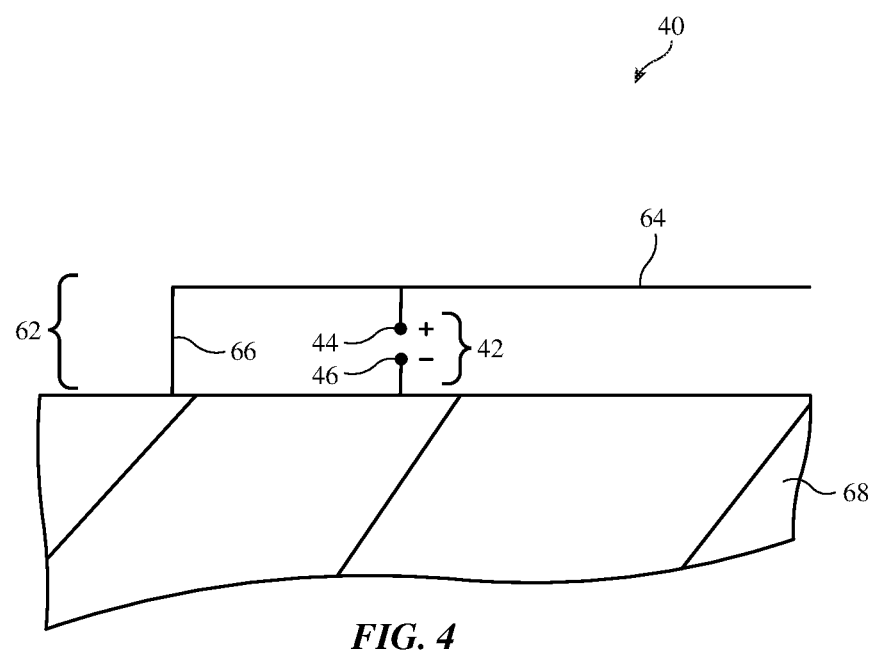
FIG. 4 is a schematic diagram of illustrative inverted-F antenna structures in accordance with some embodiments.

FIG. 4 is a schematic diagram of inverted-F antenna structures that may be used to form the upper antennas and/or any other desired antennas 40 in device 10. As shown in FIG. 4, antenna 40 (e.g., one of upper antennas 40U-1 and 40U-2 of FIG. 3) may include an antenna resonating element such as antenna resonating element 62 and an antenna ground such as antenna ground 68. Antenna resonating element 62 may include a resonating element arm 64 (sometimes referred to herein as antenna resonating element arm 64, radiating arm 64, radiating element arm 64, antenna arm 64, or arm 64) that is shorted to antenna ground 68 by return path 66. Antenna 40 may be fed by coupling a transmission line (e.g., transmission line 38 of FIG. 2) to positive antenna feed terminal 44 and ground antenna feed terminal 46 of antenna feed 42. Positive antenna feed terminal 44 may be coupled to resonating element arm 64 and ground antenna feed terminal 46 may be coupled to antenna ground 68. Return path 66 may be coupled between resonating element arm 64 and antenna ground 69 in parallel with antenna feed 42.

The length of resonating element arm 64 may determine the response (e.g., resonant) frequency of the antenna. For example, the length of resonating element arm 64 may be approximately equal to (e.g., within 15% of) one-quarter of an effective wavelength corresponding to a frequency in the frequency band of operation of antenna 40 (e.g., where the effective wavelength is equal to a free space wavelength multiplied by a constant value associated with the dielectric material surrounding antenna 40). In the example of FIG. 4, antenna 40 includes only a single resonating element arm 64. This is merely illustrative. If desired, antenna 40 may include any desired number of resonating element arms or branches having any desired shapes and following any desired paths (e.g., for conveying signals in multiple frequency bands). One or more tunable components such as tunable components 52 of FIG. 2 may be coupled between resonating element arm 64 and antenna ground 68 or elsewhere on antenna 40 to tune antenna 40 to cover one or more desired frequency bands. One or more harmonic modes of resonating element arm 64 may also be used to increase the number of frequency bands covered by antenna 40.

In one suitable arrangement that is described herein as an example, each of lower antennas 40L-1, 40L-2, 40L-3, and 40L-4 of FIG. 3 may be formed using open slot antenna structures. Antennas that are implemented using open slot antenna structures may sometimes be referred to herein as open slot antennas (e.g., slot antennas having radiating elements formed from slots with an open end).

Figure 5:
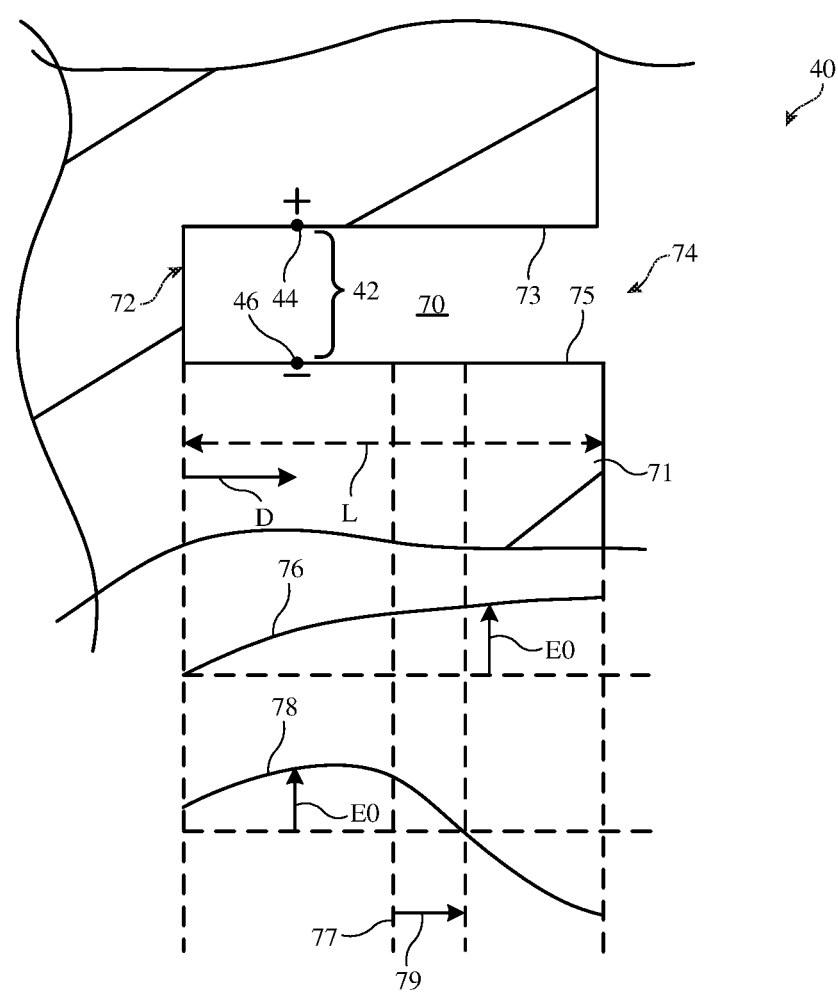
FIG. 5 is a schematic diagram of illustrative open slot antenna structures in accordance with some embodiments.

FIG. 5 is a schematic diagram of open slot antenna structures that may be used to form the lower antennas and/or any other desired antennas 40 in device 10. As shown in FIG. 5, antenna 40 (e.g., a given one of lower antennas 40L-1, 40L-2, 40L-3, and 40L-4 of FIG. 3) may include a conductive structure such as conductive structure 71 that has been provided with a dielectric-filled opening such as dielectric opening 70. Opening 70 may sometimes be referred to herein as slot 70, slot element 70, slot radiating element 70, slot resonating element 70, antenna slot 70, or slot antenna resonating element 70.

In some scenarios, slot 70 is a closed slot where conductive structure 71 completely surrounds and encloses slot 70 (e.g., where an entirety of the lateral periphery of slot 70 is defined by conductive structure 71). In the example of FIG. 5 in which antenna 40 is an open slot antenna, slot 70 has an open end 74 that is free from conductive material (e.g., slot 70 may protrude through conductive structure 71). As shown in FIG. 5, slot 70 may have a first edge 72 (sometimes referred to herein as a closed end of slot 70) opposite open end 74. Slot 70 may have a longitudinal (e.g., longest) axis extending from first edge 72 to open end 74. Slot 70 may also have a third edge 75 and a fourth edge 73 (e.g., extending parallel to the longitudinal axis of slot 70 from first edge 72 to open end 74). Conductive structure 71 may define edges 72, 73, and 75 of slot 70. Slot 70 may have a length L measured parallel to the longitudinal axis of slot 70.

Antenna feed 42 may be coupled across slot 70 at a distance D from first edge 72. Distance D may be adjusted to match the impedance of antenna 40 to the impedance of the corresponding transmission line (e.g., transmission line 38 of FIG. 2). Distance D may be between first edge 72 and the center 77 of slot 70 (as measured along length L), at a location where the antenna current experiences an impedance that matches the impedance of the corresponding transmission line, for example.

Slot 70 may be characterized by multiple electromagnetic standing wave modes that are associated with different response peaks for antenna 40. These discrete modes may be determined by the dimensions of slot 70 (e.g., length L). For example, the dimensions of slot 70 may define the boundary conditions for electromagnetic standing waves in each of the standing wave modes that are excited on slot 70 by antenna currents conveyed over antenna feed 42 and/or by received radio-frequency signals. Such standing wave modes of slot 70 include a first order (e.g., fundamental) mode and one or more higher order modes (e.g., harmonics of the first order mode). Slot 70 may exhibit antenna performance (efficiency) peaks at frequencies associated with the first order mode and one or more higher order modes of slot 70.

Curves 76 and 78 are shown on FIG. 5 to illustrate some of the standing wave modes of slot 70. As shown in FIG. 5, curves 76 and 78 plot the voltage across slot 70 (perpendicular to length L) at different points along length L. Similarly, curves 76 and 78 may also represent the magnitude of the electric field E0 within slot 70 at different points along length L (e.g., where electric field E0 extends in a direction perpendicular to length L). In each mode, nodes in the voltage distribution are present at first edge 72 of slot 70 (e.g., length L establishes boundary conditions for the electromagnetic standing waves produced on slot 70 in the different modes).

Curve 76 represents the voltage distribution across slot 70 in a first order mode (sometimes referred to herein as the fundamental mode or λ/4 mode of slot 70). As shown by curve 76, in the first order mode, the voltage across slot 70 and the magnitude of electric field E0 reach a maximum (e.g., an anti-node) at open end 74 (e.g., at length L from first edge 72). Length L may be selected to be approximately equal to one-quarter of the effective wavelength corresponding to a frequency in a first frequency band of operation of antenna 40 (e.g., length L may be approximately equal to λ/4, where λ is the effective wavelength corresponding to a frequency in the first frequency band). The effective wavelength is equal to a free space wavelength multiplied by a constant factor determined by the dielectric material filling slot 70.

Higher order modes of slot 70 (e.g., harmonic modes of the first order mode shown by curve 76) such as a third order mode may also configure slot 70 to radiate in at least a second frequency band. Curve 78 represents the voltage distribution across slot 70 in a third order mode (sometimes referred to herein as a harmonic mode or 3λ/4 mode of slot 70). As shown by curve 78, in the third order mode, the voltage across slot 70 and the magnitude of electric field E0 reach maxima at open end 74 and between center 77 and first edge 72. In the third order mode, the voltage across slot 70 and the magnitude of electric field E0 reach a minimum (e.g., a node) at distance 79 from the center 77 of slot 70. The third order mode may configure slot 70 to cover at least a second frequency band at higher frequencies than the first frequency band covered by the first order mode (e.g., a frequency band that includes a frequency corresponding to an effective wavelength equal to 3λ/4).

This example in which length L is selected to be approximately equal to one-quarter of the effective wavelength corresponding to a frequency in the first frequency band and the third order mode is used to cover the second frequency band is merely illustrative. In another suitable arrangement, length L may be selected so that slot 70 exhibits a third order mode in the second frequency band. For example, length L may be selected so that length L is approximately equal to 3λ/4, where λ is an effective wavelength corresponding to a frequency in the second frequency band. However, if care is not taken, selecting length L based on the third order harmonic in this way may create a first order mode that is located outside of the first frequency band.

In order to recover a response peak in the first frequency band, a tunable component may be coupled across slot 70 to re-align the first order mode with the first frequency band. For example, a tunable component (e.g., tunable component 52 of FIG. 2) may be coupled across slot 70 (e.g., between edges 73 and 75) at distance 79 from center 77. Coupling the tunable component across slot 70 at this location may cause the tunable component to tune the first order mode without tuning the third order mode of slot 70 (e.g., because the first order mode has a non-zero voltage magnitude at distance 79 from center 77 whereas the third order mode has a node at distance 79 from center 77). The tunable component may serve to tune the first order mode to align with the first frequency band, thereby recovering a response peak for slot 70 in the first frequency band. This may thereby configure slot 70 to radiate with satisfactory antenna efficiency in both the first frequency band (e.g., due to the re-tuned first order mode) and the second frequency band (e.g., due to the third order mode established by length L). As just one example, the first frequency band may include the cellular ultra-high band from 3400 to 3800, the cellular midband from 1700 to 2200 MHz, and/or the cellular high band from 2300 to 2700 MHz, whereas the second frequency band is the 5 GHz WLAN band from 5180 to 5825 MHz. If desired, the tunable component may also be adjusted in real time between a first state in which the first order mode covers the cellular midband and a second state in which the first order mode covers the cellular high band. In yet another suitable arrangement, the first order mode may cover each of the cellular midband, cellular high band, and 2.4 GHz WLAN and WPAN bands, where the tunable component may be switched to optimize the response of the antenna in each of these bands as needed.

The example of FIG. 5 is merely illustrative. In general, slot 70 may have any desired shape (e.g., having any desired number of curved and/or straight segments). For example, slot 70 may have a meandering shape with different segments extending in different directions, may have straight and/or curved edges, may have more than one open end, etc. Conductive structure 71 may be formed from any desired conductive electronic device structures. For example, conductive structure 71 may include conductive traces on printed circuit boards or other substrates, sheet metal, metal foil, conductive structures associated with display 14 (FIG. 1), conductive portions of housing 12 (e.g., portions of peripheral conductive housing structures 12W and/or conductive rear housing wall 12R of FIG. 1), and/or other conductive structures within device 10. In one suitable arrangement, different sides (edges) of slot 70 may be defined by different conductive structures. For example, edge 73 of slot 70 may be defined by conductive rear housing wall 12R whereas edge 75 is defined by peripheral conductive housing structures 12W.

Figure 6:
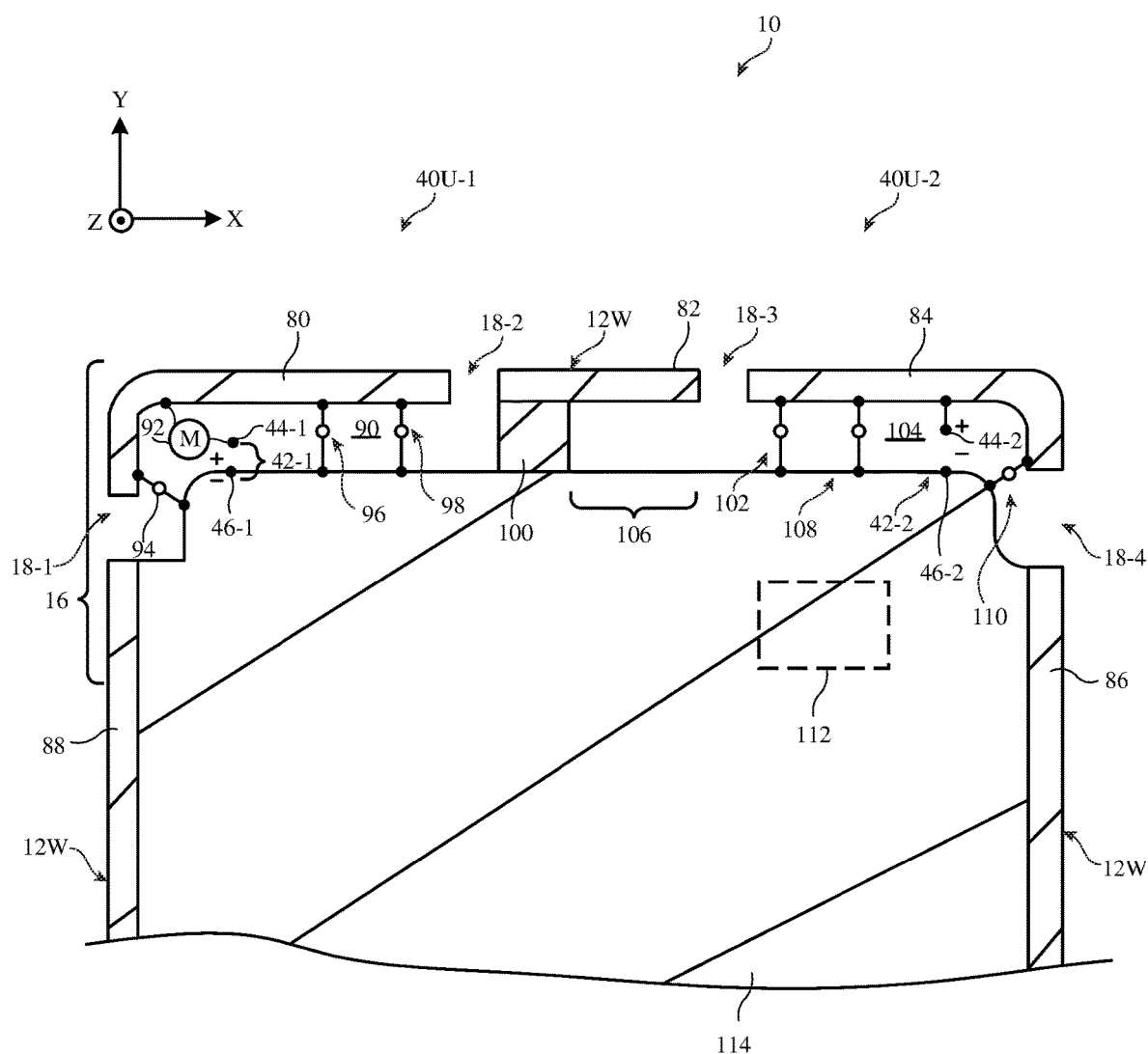
FIG. 6 is a top view of illustrative antennas located at an upper end of an electronic device in accordance with some embodiments.

FIG. 6 is a top interior view of upper end 16 of device 10 in which upper antennas 40U-1 and 40U-2 are located for performing wireless communications (e.g., using a MIMO scheme). As shown in FIG. 6, device 10 may have peripheral conductive housing structures such as peripheral conductive housing structures 12W. In the example of FIG. 6, display 14 is not shown for the sake of clarity.

Gap 18-1 may be formed in the left sidewall of peripheral conductive housing structures 12W. Gaps 18-2 and 18-3 may be formed in the top sidewall of peripheral conductive housing structures 12W. Gap 18-4 may be formed in the right sidewall of peripheral conductive housing structures 12W. Gap 18-1 may separate segment 88 of peripheral conductive housing structures 12W from segment 80 of peripheral conductive housing structures 12W. Segment 80 may include both a portion of the left sidewall and a portion of the top sidewall of peripheral conductive housing structures 12W. Gap 18-2 may separate segment 80 from segment 82 of peripheral conductive housing structures 12W. Gap 18-3 may separate segment 82 from segment 84 of peripheral conductive housing structures 12W. Segment 84 may include both a portion of the top sidewall and a portion of the right sidewall of peripheral conductive housing structures 12W. Gap 18-4 may separate segment 84 from segment 86 of peripheral conductive housing structures 12W. Gaps 18-1, 18-2, 18-3, and 18-4 may be filled with plastic, ceramic, sapphire, glass, epoxy, or other dielectric materials. The dielectric material in these gaps may lie flush with peripheral conductive housing sidewalls 12W at the exterior surface of device 10 if desired.

A conductive structure such as conductive layer 114 may extend between the left and right sidewalls of peripheral conductive housing structures 12W. Conductive layer 114 may be formed from conductive housing structures, conductive structures from electrical device components in device 10, printed circuit board traces, strips of conductor such as strips of wire and metal foil, conductive components in a display (e.g., display 14 of FIG. 1), and/or other conductive structures (e.g., conductive layer 114 need not be confined to a single plane). In one suitable arrangement, conductive layer 114 is formed from conductive rear housing wall 12R of FIG. 1. Conductive layer 114 may sometimes be referred to herein as support plate 114 or backplate 114.

As shown in FIG. 6, conductive layer 114 (e.g., conductive rear housing wall 12R) may extend between the opposing edges (e.g., the left and right edges) of device 10. Conductive layer 114 may be formed from a separate metal structure from peripheral conductive housing structures 12W or conductive layer 114 and peripheral conductive housing structures 12W may be formed from the same, continuous, integral metal structure (e.g., in a unibody configuration). Conductive layer 114 and segments 88 and 86 of peripheral conductive housing structures 12W may be held at a ground potential and may form the antenna ground for upper antennas 40U-1 and 40U-2.

Segment 80 may be separated from conductive layer 114 by slot 90. Slot 90 may have a first end defined by gap 18-1 and an opposing second end defined by gap 18-2 (e.g., slot 90 may be continuous with gaps 18-1 and 18-2). Upper antenna 40U-1 may, for example, be an inverted-F antenna having a resonating element arm formed from segment 80 (e.g., segment 80 may form resonating element arm 64 of FIG. 4 for upper antenna 40U-1). Conductive layer 114 and segments 88 and 86 may form the antenna ground for upper antenna 40U-1 (e.g., antenna ground 68 of FIG. 4).

Upper antenna 40U-1 may be fed by a corresponding antenna feed 42-1 coupled across slot 90. Positive antenna feed terminal 44-1 of antenna feed 42-1 may be coupled to segment 80 whereas ground antenna feed terminal 46-1 is coupled to conductive layer 114. Impedance matching circuitry (M) such as impedance matching circuitry 92 may be coupled between positive antenna feed terminal 44-1 and segment 80. Matching circuitry 92 may be adjustable to tune the frequency response of upper antenna 40U-1. Matching circuitry 92, for example, include an inductor and a switchable capacitor coupled in parallel between positive antenna feed terminal 44-1 and ground. The switchable capacitor may be switched into or out of use to adjust the tuning of upper antenna 40U-1.

Tunable components such as tunable components 94, 96, and 98 (e.g., tunable components 52 of FIG. 2) may be coupled between segment 80 and conductive layer 114 across slot 90. Tunable component 94 may be coupled to a point on segment 80 between antenna feed 42-1 and gap 18-1. Tunable component 98 may be coupled to a point on segment 80 between antenna feed 42-1 and gap 18-2. Tunable component 96 may be coupled to a point on segment 80 between antenna feed 42-1 and tunable component 98.

Upper antenna 40U-1 may be a multi-band antenna that covers multiple frequency bands. Different portions of segment 80 may radiate in different frequency bands. For example, the length of the portion of segment 80 extending from antenna feed 42-1 to gap 18-1 may be selected to support a resonance in the cellular high band (e.g., antenna currents flowing on this portion of segment 80 in the cellular high band may radiate corresponding radio-frequency signals), the length of the portion of segment 80 extending from antenna feed 42-1 to tunable component 96 may be selected to support a resonance in the cellular midband, and the length of segment 80 from gap 18-1 to gap 18-2 may be selected to support a resonance in the cellular low band and cellular low-midband. These lengths of segment 80 may, for example, be selected to cover these frequency bands in a first order (fundamental) mode. One or more harmonic modes of these lengths may also configure upper antenna 40U-1 to cover additional frequency bands. For example, a fifth harmonic mode of the length of segment 80 from gap 18-1 to gap 18-2 and/or a third harmonic mode of the portion of segment 80 extending from antenna feed 42-1 to tunable component 96 may radiate in the cellular ultra-high band.

Tunable components 94, 96, and 98 may each tune a frequency response of upper antenna 40U-1 in these frequency bands. Tunable components 94, 96, and 98 may each include any desired number of capacitors, resistors, inductors, and/or switches coupled in any desired manner between segment 80 and conductive layer 114. As an example, tunable component 94 may include two or more switchable inductors coupled in parallel between segment 80 and conductive layer 114. Tunable component 94 may, for example, help to set the radiating length of segment 80 in the cellular low band and/or may tune the frequency response of upper antenna 40U-1 in the cellular high band. Tunable component 96 may, for example, include a capacitor (e.g., a fixed capacitor coupled across slot 90). The capacitance of tunable component 96 may help to tune the frequency response of upper antenna 40U-1 in the cellular midband. Tunable component 98 may, for example, include multiple switchable inductors (e.g., four switchable inductors) coupled in parallel between segment 80 and conductive layer 114. The inductors in tunable component 98 may be switched into or out of use to tune a frequency response of upper antenna 40U-1 between and/or within the cellular low band and cellular low-midband. These examples are merely illustrative and, in general, any desired tunable components may be coupled to segment 80 for supporting resonances in any desired number of frequency bands at any desired frequencies. Tunable components 94, 96, and/or 98 and/or matching circuitry 92 may be mounted to one or more shared or separate substrates (e.g., flexible printed circuits, rigid printed circuit boards, etc.).

Segment 84 of peripheral conductive housing structures 12W may be separated from conductive layer 114 by slot 104. Slot 104 may have a first end defined by gap 18-3 and an opposing second end defined by gap 18-4 (e.g., slot 104 may be continuous with gaps 18-3 and 18-4). If desired, slot 104 may include an extended portion 106 interposed between segment 82 and conductive layer 114. Extended portion 106 of slot 104 may, for example, serve to improve the impedance matching and/or extend the bandwidth of upper antenna 40U-2. Upper antenna 40U-2 may, for example, be an inverted-F antenna having a resonating element arm formed from segment 84 (e.g., segment 84 may form resonating element arm 64 of FIG. 4 for upper antenna 40U-2). Conductive layer 114 and segments 88 and 86 may form the antenna ground for upper antenna 40U-2 (e.g., antenna ground 68 of FIG. 4).

Conductive bridging structures such as conductive structures 100 may be coupled between segment 82 of peripheral conductive housing structures 12W and conductive layer 114. Conductive structures 100 may electrically isolate slot 90 from slot 104 (e.g., conductive structures 100 may define edges or closed ends of slots 90 and 104). Conductive structures 100 may, as examples, be formed from metal traces on printed circuits, metal foil, metal members formed from a sheet of metal, conductive portions of housing 12 (e.g., integral portions of conductive rear housing wall 12R and/or peripheral conductive housing structures 12W), conductive wires, conductive portions of input-output devices 32 of FIG. 2 (e.g., conductive portions of display 14 of FIG. 1, conductive portions of a camera module or light sensor module, conductive portions of a speaker module, conductive portions of a data port such as a universal serial bus port, etc.), conductive interconnect structures such as conductive pins, conductive brackets, conductive adhesive, solder, welds, conductive springs, conductive screws, or combinations of these and/or other conductive interconnect structures, conductive foam, switchable or fixed inductive paths (e.g., one or more switchable inductors), switchable or fixed capacitive paths (e.g., one or more switchable capacitors), and/or any other desired conductive components or structures.

Slots 90 and 104 may be filled with plastic, glass, sapphire, epoxy, ceramic, or other dielectric material. In one suitable arrangement, slots 90 and 104 may be formed from a single continuous dielectric-filled slot at the exterior of device 10 (e.g., where a single continuous piece of dielectric material is used to fill slots 90 and 104 as well as gaps 18-1, 18-2, 18-3, and 18-4). In this scenario, conductive structures 100 may be formed at the interior of device 10 and may serve to electrically divide the continuous dielectric-filled slot into separate slots 90 and 104 (e.g., at the interior of device 10).

Upper antenna 40U-2 may be fed by a corresponding antenna feed 42-2 coupled across slot 104. Positive antenna feed terminal 44-2 of antenna feed 42-2 may be coupled to segment 84 whereas ground antenna feed terminal 46-2 is coupled to conductive layer 114. Tunable components such as tunable components 102, 108, and 110 (e.g., tunable components 52 of FIG. 2) may be coupled between segment 84 and conductive layer 114 across slot 104. Tunable component 102 may be coupled to a point on segment 84 between antenna feed 42-2 and gap 18-3. Tunable component 108 may be coupled to a point on segment 84 between antenna feed 42-2 and tunable component 102. Tunable component 110 may be coupled to a point on segment 84 between antenna feed 42-2 and gap 18-4.

Upper antenna 40U-2 may be a multi-band antenna that covers multiple frequency bands. Different portions of segment 84 may radiate in different frequency bands. For example, the length of the portion of segment 84 extending from antenna feed 42-2 to gap 18-4 may be selected to support a resonance in the cellular high band (e.g., antenna currents flowing on this portion of segment 84 in the cellular high band may radiate corresponding radio-frequency signals), the length of the portion of segment 80 extending from antenna feed 42-2 to tunable component 108 may be selected to support a resonance in the cellular midband, and the length of segment 84 from gap 18-3 to gap 18-4 may be selected to support a resonance in the cellular low band and cellular low-midband. The cellular low-midband and/or cellular midband resonances of upper antenna 40U-2 may also cover a satellite navigations frequency band such as a GPS frequency band. The cellular high band resonance of upper antenna 40U-2 (e.g., the portion of segment 84 extending between antenna feed 42-2 and tunable component 110) may also cover the 2.4 GHz WLAN band and the 2.4 GHz WPAN band. One or more harmonic modes of segment 84 may also configure upper antenna 40U-2 to cover additional frequency bands. For example, a fifth harmonic mode of the length of segment 80 from gap 18-3 to gap 18-4 and/or a third harmonic mode of the portion of segment 80 extending from antenna feed 42-2 to tunable component 108 may radiate in the cellular ultra-high band.

Tunable components 102, 108, and 110 may each tune a frequency response of upper antenna 40U-2 in these frequency bands. Tunable components 102, 108, and 110 may each include any desired number of capacitors, resistors, inductors, and/or switches coupled in any desired manner between segment 84 and conductive layer 114. Tunable component 110 may, for example, help to set the radiating length of segment 84 in the cellular low band and/or may tune the frequency response of upper antenna 40U-2 in the cellular high band. Tunable component 108 may, for example, tune the frequency response of upper antenna 40U-2 in the cellular midband. Tunable component 102 may, for example, tune the frequency response of upper antenna 40U-2 between and/or within the cellular low band and the cellular low-midband. These examples are merely illustrative and, in general, any desired tunable components may be coupled to segment 80 for supporting resonances in any desired number of frequency bands at any desired frequencies. Tunable components 102, 108, and/or 110 may be mounted to one or more shared or separate substrates (e.g., flexible printed circuits, rigid printed circuit boards, etc.).

If desired, an input-output device such as camera module 112 may be mounted to conductive layer 114 adjacent to upper antenna 40U-2. If care is not taken, the presence of conductive material in camera module 112 can undesirably detune upper antenna 40U-2. Tunable components 102, 108, 110, and/or other tunable components in upper antenna 40U-2 may help to compensate for potential detuning by camera module 112.

Figure 7:
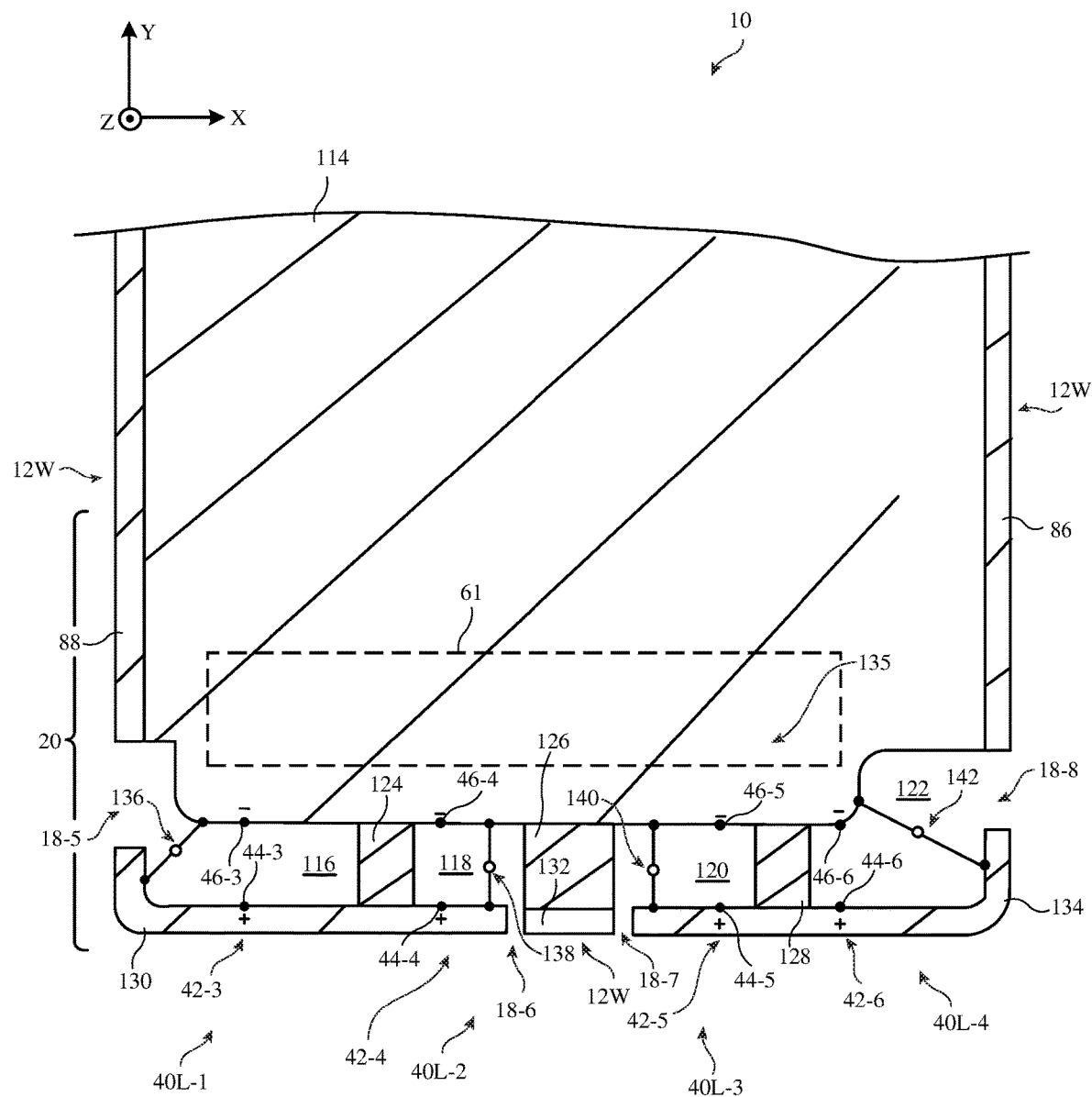
FIG. 7 is a top view of illustrative antennas located at a lower end of an electronic device in accordance with some embodiments.

FIG. 7 is a top interior view of lower end 20 of device 10, in which lower antennas 40L-1, 40L-2, 40L-3, and 40L-4 are located for performing wireless communications (e.g., using a MIMO scheme). As shown in FIG. 7, gap 18-5 may be formed in the left sidewall of peripheral conductive housing structures 12W. Gaps 18-6 and 18-7 may be formed in the bottom sidewall of peripheral conductive housing structures 12W. Gap 18-8 may be formed in the right sidewall of peripheral conductive housing structures 12W.

Gap 18-5 may separate segment 88 of peripheral conductive housing structures 12W from segment 130 of peripheral conductive housing structures 12W. Segment 130 may include both a portion of the left sidewall and a portion of the bottom sidewall of peripheral conductive housing structures 12W. Gap 18-6 may separate segment 130 from segment 132 of peripheral conductive housing structures 12W. Gap 18-7 may separate segment 132 from segment 134 of peripheral conductive housing structures 12W. Segment 134 may include both a portion of the bottom sidewall and a portion of the right sidewall of peripheral conductive housing structures 12W. Gap 18-8 may separate segment 134 from segment 86 of peripheral conductive housing structures 12W. Gaps 18-5, 18-6, 18-7, and 18-8 may be filled with plastic, ceramic, sapphire, glass, epoxy, or other dielectric materials. The dielectric material in these gaps may lie flush with peripheral conductive housing structures 12W at the exterior surface of device 10 if desired.

Segment 130 may be separated from conductive layer 114 by slots 116 and 118. Segment 134 may be separated from conductive layer 114 by slots 120 and 122. Conductive bridging structures such as conductive structures 124 may be coupled between segment 130 of peripheral conductive housing structures 12W and conductive layer 114. Conductive bridging structures such as conductive structures 126 may be coupled between segment 132 and conductive layer 114. Conductive bridging structures such as conductive structures 128 may be coupled between segment 134 and conductive layer 114.

Conductive structures 124 may electrically isolate slot 116 from slot 118 (e.g., conductive structures 124 may define edges or closed ends of slots 116 and 118). Conductive structures 126 may electrically isolate slot 118 from slot 120. Conductive structures 128 may electrically isolate slot 120 from slot 122 (e.g., conductive structures 128 may define edges or closed ends of slots 120 and 122). Conductive structures 124, 126, and 128 may, as examples, be formed from metal traces on printed circuits, metal foil, metal members formed from a sheet of metal, conductive portions of housing 12 (e.g., integral portions of conductive rear housing wall 12R and/or peripheral conductive housing structures 12W), conductive wires, conductive portions of input-output devices 32 of FIG. 2 (e.g., conductive portions of display 14 of FIG. 1, conductive portions of a camera module or light sensor module, conductive portions of a speaker module, conductive portions of a data port such as a universal serial bus port, etc.), conductive interconnect structures such as conductive pins, conductive brackets, conductive adhesive, solder, welds, conductive springs, conductive screws, or combinations of these and/or other conductive interconnect structures, conductive foam, switchable or fixed inductive paths (e.g., one or more switchable inductors), switchable or fixed capacitive paths (e.g., one or more switchable capacitors), and/or any other desired conductive components or structures.

Slots 116, 118, 120, and 122 may be filled with plastic, glass, sapphire, epoxy, ceramic, or other dielectric material. In one suitable arrangement, slots 116, 118, 120, and 122 may be formed from a single continuous dielectric-filled slot at the exterior of device 10 (e.g., where a single continuous piece of dielectric material is used to fill slots 116, 118, 120, and 122 as well as gaps 18-5, 18-6, 18-7, and 18-8). In this scenario, conductive structures 124, 126, and 128 may be formed at the interior of device 10 and may serve to electrically divide the continuous dielectric-filled slot into separate slots 116, 118, 120, and 122 (e.g., at the interior of device 10).

As shown in FIG. 7, lower antennas 40L-1, 40L-2, 40L-3, and 40L-4 may each be open slot antennas. Lower antenna 40L-1 may be fed by a corresponding antenna feed 42-3 coupled across slot 116. Positive antenna feed terminal 44-3 of antenna feed 42-3 may be coupled to segment 130 whereas ground antenna feed terminal 46-3 is coupled to conductive layer 114. Slot 116 may form the radiating element for lower antenna 40L-1. For example, slot 116 may form slot 70 of FIG. 5 for lower antenna 40L-1, where segment 130, conductive structures 124, and conductive layer 114 form conductive structure 71 of FIG. 5 (e.g., edge 75 of FIG. 5 may be defined by conductive layer 114 whereas edge 73 of FIG. 5 is defined by segment 130).

Slot 116 of FIG. 7 may be an open slot. Conductive structures 124 may form the closed end of slot 116 (e.g., first edge 72 of FIG. 5). Gap 18-5 may form the open end of slot 116 (e.g., open end 74 of FIG. 5). In other words, gap 18-5 may be continuous with slot 116. The length of slot 116 (e.g., length L of FIG. 5) may be determined by the length of slot 116 extending from conductive structures 124 to gap 18-5. The vertical height of gap 18-5 (e.g., parallel to the Z-axis of FIG. 7) may also contribute to the length of slot 116 if desired. In this example, slot 116 has a first portion extending from conductive structures 124 to the left sidewall of peripheral conductive housing structures 12W (parallel to the X-axis), a second portion extending from an end of the first portion to gap 18-5 (parallel to the Y-axis), and a third portion extending from an end of the second portion up the height of gap 18-5 (parallel to the Z-axis), where the first, second, and third portions define the length of the slot. This is merely illustrative and, in general, slot 116 may have any desired shape with any desired number of curved and/or straight portions having any desired number of curved and/or straight edges.

A tunable component such as tunable component 136 (e.g., tunable component 52 of FIG. 2) may be coupled between segment 130 and conductive layer 114 across slot 116. Tunable component 136 may be coupled to a point on segment 130 between antenna feed 42-3 and gap 18-5. Lower antenna 40L-1 may be a multi-band antenna that covers multiple frequency bands. The length of slot 116 may be selected so that slot 116 radiates in the cellular midband (e.g., from 1700 to 2200 MHz), the cellular high band (e.g., from 2300 to 2700 MHz), the 2.4 GHz WLAN band (e.g., from 2400 to 2480 MHz), and the 2.4 GHz WPAN band (e.g., using the same standing wave mode such as the first order mode of slot 116). Tunable component 136 may be adjusted to optimize the frequency response in one or more of these bands at any given time as needed.

Lower antenna 40L-2 may be fed by a corresponding antenna feed 42-4 coupled across slot 118. Positive antenna feed terminal 44-4 of antenna feed 42-4 may be coupled to segment 130 whereas ground antenna feed terminal 46-4 is coupled to conductive layer 114. Slot 118 may form the radiating element for lower antenna 40L-2. For example, slot 118 may form slot 70 of FIG. 5 for lower antenna 40L-2, where segment 130, conductive structures 124, conductive structures 126, and conductive layer 114 form conductive structure 71 of FIG. 5 (e.g., edge 73 of FIG. 5 may be defined by segment 130 whereas edge 75 of FIG. 5 is defined by conductive layer 114 and conductive structures 126).

Slot 118 of FIG. 7 may be an open slot. Conductive structures 124 may form the closed end of slot 118 (e.g., first edge 72 of FIG. 5). Gap 18-6 may form the open end of slot 118 (e.g., open end 74 of FIG. 5). In other words, gap 18-6 may be continuous with slot 118. The length of slot 118 (e.g., length L of FIG. 5) may be determined by the length of slot 118 extending from conductive structures 124 to gap 18-6. The vertical height of gap 18-6 (e.g., parallel to the Z-axis of FIG. 7) may also contribute to the length of slot 118 if desired. In this example, slot 118 has a first portion extending from conductive structures 124 to gap 18-6 (parallel to the X-axis) and a second portion extending from an end of the first portion up the height of gap 18-6 (parallel to the Z-axis), where the first and second portions define the length of the slot. This is merely illustrative and, in general, slot 118 may have any desired shape with any desired number of curved and/or straight portions having any desired number of curved and/or straight edges.

Lower antenna 40L-2 may be a multi-band antenna that covers multiple frequency bands. For example, the length of slot 118 may be selected so that slot 118 has a first order mode that radiates in the cellular ultra-high band from 3400 to 3800 MHz. A higher order mode such as a third order mode may configure slot 118 to radiate in an additional frequency band such as the 5 GHz WLAN band.

A tunable component such as tunable component 138 (e.g., tunable component 52 of FIG. 2) may be coupled between segment 130 and conductive layer 114 across slot 118. Tunable component 138 may be coupled to a point on segment 130 between antenna feed 42-4 and gap 18-6. Tunable component 138 may, for example, be coupled across slot 118 at a location where the third order mode of slot 118 exhibits a voltage or electric field node (e.g., at distance 79 from the center 77 of the slot as shown in FIG. 5). This may configure tunable component 138 to tune the first order mode frequency response of slot 118 in the cellular ultra-high band (e.g., so that lower antenna 40L-2 exhibits satisfactory antenna efficiency across the cellular ultra-high band) without affecting the third order mode frequency response of slot 118 in the 5 GHz WLAN band.

Lower antenna 40L-3 may be fed by a corresponding antenna feed 42-5 coupled across slot 120. Positive antenna feed terminal 44-5 of antenna feed 42-5 may be coupled to segment 134 whereas ground antenna feed terminal 46-5 is coupled to conductive layer 114. Slot 120 may form the radiating element for lower antenna 40L-3. For example, slot 120 may form slot 70 of FIG. 5 for lower antenna 40L-3, where segment 134, conductive structures 126, conductive structures 128, and conductive layer 114 form conductive structure 71 of FIG. 5 (e.g., edge 73 of FIG. 5 may be defined by segment 134 whereas edge 75 of FIG. 5 is defined by conductive layer 114 and conductive structures 126).

Slot 120 of FIG. 7 may be an open slot. Conductive structures 128 may form the closed end of slot 120 (e.g., first edge 72 of FIG. 5). Gap 18-7 may form the open end of slot 120 (e.g., open end 74 of FIG. 5). In other words, gap 18-7 may be continuous with slot 120. The length of slot 120 (e.g., length L of FIG. 5) may be determined by the length of slot 120 extending from conductive structures 128 to gap 18-7. The vertical height of gap 18-7 (e.g., parallel to the Z-axis of FIG. 7) may also contribute to the length of slot 120 if desired. In this example, slot 120 has a first portion extending from conductive structures 128 to gap 18-7 (parallel to the X-axis) and a second portion extending from an end of the first portion up the height of gap 18-7 (parallel to the Z-axis), where the first and second portions define the length of the slot. This is merely illustrative and, in general, slot 120 may have any desired shape with any desired number of curved and/or straight portions having any desired number of curved and/or straight edges.

Lower antenna 40L-3 may be a multi-band antenna that covers multiple frequency bands. For example, the length of slot 120 may be selected so that slot 120 has a first order mode that radiates in the cellular ultra-high band from 3400 to 3800 MHz. A higher order mode such as a third order mode may configure slot 120 to radiate in an additional frequency band such as the 5 GHz WLAN band.

A tunable component such as tunable component 140 (e.g., tunable component 52 of FIG. 2) may be coupled between segment 134 and conductive layer 114 across slot 120. Tunable component 140 may be coupled to a point on segment 134 between antenna feed 42-5 and gap 18-7. Tunable component 140 may, for example, be coupled across slot 120 at a location where the third order mode of slot 120 exhibits a voltage or electric field node (e.g., at distance 79 from the center 77 of the slot as shown in FIG. 5). This may configure tunable component 140 to tune the first order mode frequency response of slot 120 in the cellular ultra-high band (e.g., so that lower antenna 40L-3 exhibits satisfactory antenna efficiency across the cellular ultra-high band) without affecting the third order mode frequency response of slot 120 in the 5 GHz WLAN band.

Lower antenna 40L-4 may be fed by a corresponding antenna feed 42-6 coupled across slot 122. Positive antenna feed terminal 44-6 of antenna feed 42-6 may be coupled to segment 134 whereas ground antenna feed terminal 46-6 is coupled to conductive layer 114. Slot 122 may form the radiating element for lower antenna 40L-4. For example, slot 122 may form slot 70 of FIG. 5 for lower antenna 40L-4, where segment 134, conductive structures 128, and conductive layer 114 form conductive structure 71 of FIG. 5 (e.g., edge 73 of FIG. 5 may be defined by segment 134 whereas edge 75 of FIG. 5 is defined by conductive layer 114).

Slot 122 of FIG. 7 may be an open slot. Conductive structures 128 may form the closed end of slot 122 (e.g., first edge 72 of FIG. 5). Gap 18-8 may form the open end of slot 122 (e.g., open end 74 of FIG. 5). In other words, gap 18-8 may be continuous with slot 122. The length of slot 122 (e.g., length L of FIG. 5) may be determined by the length of slot 122 extending from conductive structures 128 to gap 18-8. The vertical height of gap 18-8 (e.g., parallel to the Z-axis of FIG. 7) may also contribute to the length of slot 122 if desired. In this example, slot 122 has a first portion extending from conductive structures 128 to the right sidewall of peripheral conductive housing structures 12W (parallel to the X-axis), a second portion extending from an end of the first portion to gap 18-8 (parallel to the Y-axis), and a third portion extending from an end of the second portion up the height of gap 18-8 (parallel to the Z-axis), where the first, second, and third portions define the length of the slot. This is merely illustrative and, in general, slot 122 may have any desired shape with any desired number of curved and/or straight portions having any desired number of curved and/or straight edges.

Lower antenna 40L-4 may be a multi-band antenna that covers multiple frequency bands. For example, the length of slot 122 may be selected so that slot 122 has a third order mode that radiates in the 5 GHz WLAN band from (e.g., from 5180 to 5825 MHz). A lower order mode such as the first order mode may configure slot 122 to radiate in additional frequency bands such as the cellular midband and the cellular high band.

A tunable component such as tunable component 142 (e.g., tunable component 52 of FIG. 2) may be coupled between segment 134 and conductive layer 114 across slot 122. Tunable component 142 may be coupled to a point on segment 134 between antenna feed 42-6 and gap 18-8. Tunable component 142 may, for example, be coupled across slot 122 at a location where the third order mode of slot 122 exhibits a voltage or electric field node (e.g., at distance 79 from the center 77 of the slot as shown in FIG. 5). This may configure tunable component 142 to tune the first order mode frequency response of slot 120 without affecting the third order mode frequency response of slot 122 in the 5 GHz WLAN band. As one example, tunable component 142 may have first and second states. When placed in the first state, the tunable component may configure the first order mode of slot 122 to radiate in the cellular midband (e.g., affecting the third order mode frequency response of slot 122 in the 5 GHz WLAN band). When placed in the second state, the tunable component may configure the first order mode of slot 122 to radiate in the cellular high band (e.g., without affecting the third order mode frequency response of slot 122 in the 5 GHz WLAN band).

As shown in FIG. 7, conductive layer 114 may have a protruding portion 135 that extends beyond gaps 18-5 and 18-8 (e.g., as measured parallel to the Y-axis). Display controller 61 may be located adjacent to lower antennas 40L-1, 40L-2, 40L-3, and 40L-4 at lower end 20 of device 10. Some, none, or all of display controller 61 may, if desired, overlap protrusion 135 of conductive layer 114. The presence of display controller 61 may prevent the lower antennas from having sufficient volume to cover the cellular low band or the cellular low-midband.

One or more substrates such as one or more flexible printed circuits and/or rigid printed circuit boards may be used for mounting tunable components 136, 138, 140, and/or 142. As one example, tunable components 136 and 138 of lower antennas 40L-1 and 40L-2 may be mounted to a first flexible printed circuit whereas tunable components 140 and 142 of lower antennas 40L-3 and 40L-4 are mounted to a second flexible printed circuit. The first flexible printed circuit may carry transmission line structures that couple antenna feeds 42-3 and 42-4 to transceiver circuitry 36 of FIG. 3. The second flexible printed circuit may carry transmission line structures that couple antenna feeds 42-5 and 42-6 to transceiver circuitry 36 of FIG. 3.

Figure 8:
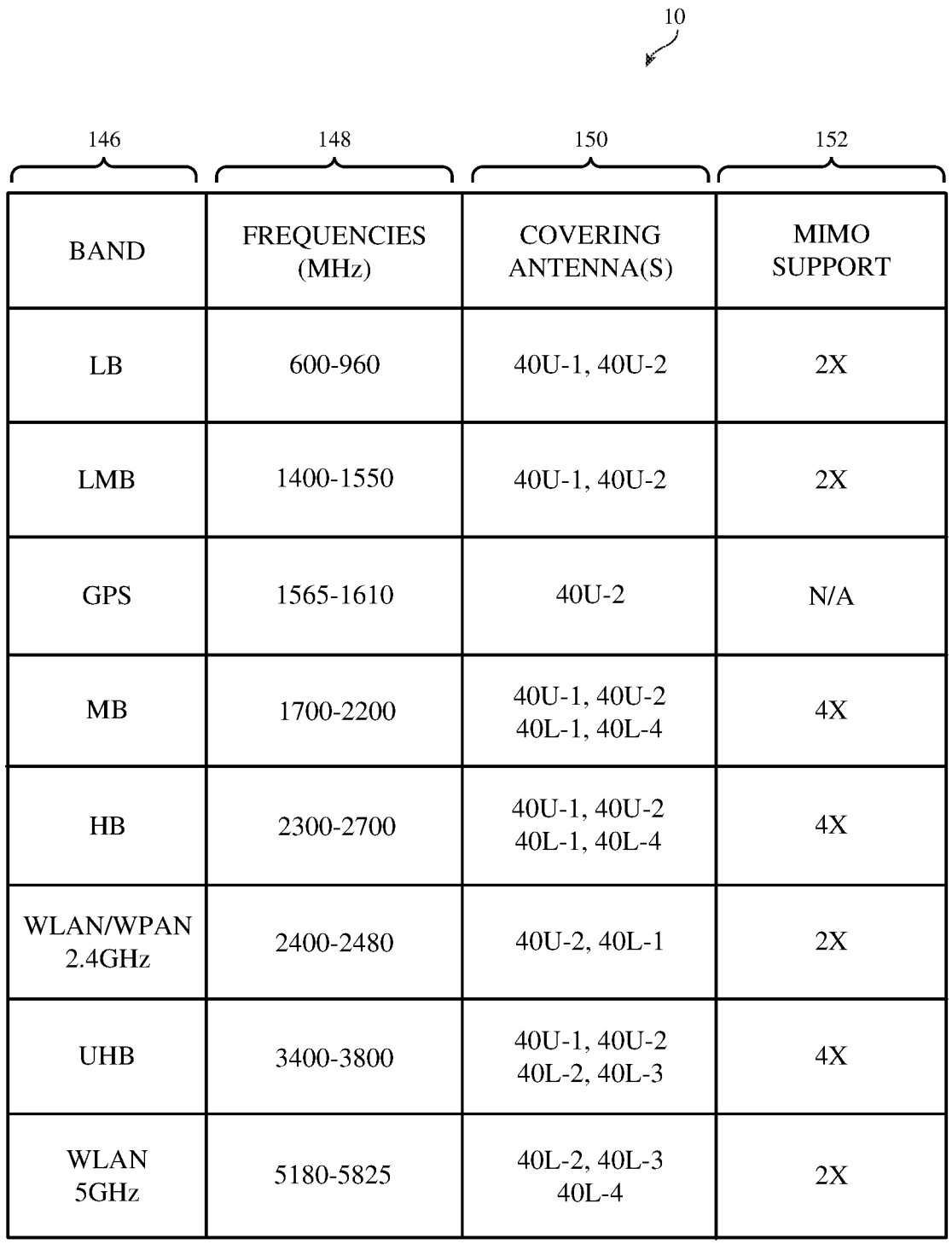
FIG. 8 is a chart of illustrative frequency bands that may be covered by the illustrative antennas of FIGS. 3-7 in accordance with some embodiments.

FIG. 8 shows a table 144 that illustrates how antennas 40U-1, 40U-2, 40L-1, 40L-2, 40L-3, and 40L-4 of FIGS. 3-7 may collectively cover each frequency band of operation for device 10. Column 146 of table 144 lists different frequency bands of operation for device 10. Column 148 of table 144 lists exemplary frequency ranges corresponding to the frequency bands in column 146. Column 150 lists the antennas that are able to cover each of the frequency bands in column 146. Column 152 lists the MIMO operations supported for each of the frequency bands in column 146.

As shown by table 144, upper antennas 40U-1 and 40U-2 may cover the cellular low band (e.g., from 600 to 960 MHz) and the cellular low-midband (e.g., from 1400 to 1550 MHz). Upper antennas 40U-1 and 40U-2 may support up to 2×MIMO operations in the cellular low band and/or in the cellular low-midband. Upper antenna 40U-2 may cover the GPS band (e.g., from 1565 to 1610 MHz). Upper antennas 40U-1 and 40U-2 and lower antennas 40L-1 and 40L-4 may cover the cellular midband (e.g., from 1700 to 2200 MHz) and the cellular high band (e.g., from 2300 to 2700 MHz). Antennas 40U-1, 40U-2, 40L-1, and 40L-4 may support up to 4×MIMO operations in the cellular midband and/or in the cellular high band. Upper antenna 40U-2 and lower antenna 40L-1 may cover the 2.4 GHz WLAN band and the 2.4 GHz WPAN band (e.g., from 2400 to 2480 MHz). Antennas 40U-2 and 40L-1 may support up to 2×MIMO operations in the 2.4 GHz WLAN band. Upper antennas 40U-1 and 40U-2 and lower antennas 40L-2, and 40L-3 may cover the cellular ultra-high band (e.g., from 3400 to 3800 MHz). Antennas 40U-1, 40U-2, 40L-2, and 40L-3 may support up to 4×MIMO operations in the cellular ultra-high band. Finally, lower antennas 40L-2, 40L-3, and 40L-4 may cover the 5 GHz WLAN band (e.g., from 5180 to 5825 MHz). Antennas 40L-2, 40L-3, and 40L-4 may support up to 2×MIMO operations in the 5 GHz WLAN band.

In this way, each of the antennas may collectively cover each of these frequency bands of operation with satisfactory antenna efficiency and maximal data throughput. The example of FIG. 8 is merely illustrative. In general, device 10 may include any desired number of antennas for covering any desired number of frequency bands at any desired frequencies.

The foregoing is merely illustrative and various modifications can be made by those skilled in the art without departing from the scope and spirit of the described embodiments. The foregoing embodiments may be implemented individually or in any combination.

What is claimed is:

1. An electronic device comprising:
 a housing having peripheral conductive housing structures and a conductive rear wall, wherein the peripheral conductive housing structures comprise a conductive sidewall;
 first and second dielectric gaps in the conductive sidewall;
 a first antenna with a first slot element having edges defined by the conductive sidewall and the conductive rear wall;
 a second antenna with a second slot element having edges defined by the conductive sidewall and the conductive rear wall, wherein the second slot element has an open end defined by the first dielectric gap;
 a third antenna with a third slot element having edges defined by the conductive sidewall and the conductive rear wall, wherein the third slot element has an open end defined by the second dielectric gap; and
 a fourth antenna with a fourth slot element having edges defined by the conductive sidewall and the conductive rear wall, wherein the second and third slot elements are interposed between the first and fourth slot elements.

2. The electronic device defined in claim 1, further comprising:
 a third dielectric gap in the peripheral conductive housing structures, wherein the first slot element has an open end defined by the third dielectric gap.

3. The electronic device defined in claim 2, further comprising:
 a fourth dielectric gap in the peripheral conductive housing structures, wherein the fourth slot element has an open end defined by the fourth dielectric gap.

4. The electronic device defined in claim 3, wherein the first dielectric gap divides the peripheral conductive housing structures into first and second segments, the second dielectric gap separates the second segment from a third segment of the peripheral conductive housing structures, the third dielectric gap separates the first segment from a fourth segment of the peripheral conductive housing structures, the fourth dielectric gap separates the third segment from a fifth segment of the peripheral conductive housing structures, the peripheral conductive housing structures further comprise a first additional conductive sidewall that includes the fourth segment and a portion of the first segment, the peripheral conductive housing structures further comprise a second additional conductive sidewall that includes the fifth segment and a portion of the third segment, the first and second additional conductive sidewalls extend in parallel, and the conductive sidewall extends from the first additional conductive sidewall to the second additional conductive sidewall.

5. The electronic device defined in claim 3, wherein the second slot element has a first order mode configured to radiate in a first frequency band and a third order mode configured to radiate in a second frequency band at higher frequencies than the first frequency band.

6. The electronic device defined in claim 5, wherein the third slot element has a first order mode configured to radiate in the first frequency band and a third order mode configured to radiate in the second frequency band.

7. The electronic device defined in claim 6, wherein the fourth slot element has a first order mode configured to radiate in a third frequency band at lower frequencies than the first frequency band and has a third order mode configured to radiate in the second frequency band.

8. The electronic device defined in claim 7, further comprising:
 a tunable component coupled across the fourth slot element, wherein the tunable component has first and second states, the first order mode of the fourth slot element is configured to radiate in the third frequency band when the tunable component is in the first state, and the first order mode of the fourth slot element is configured to radiate in a fourth frequency band at lower frequencies than the first frequency band when the tunable component is in the second state.

9. The electronic device defined in claim 8, wherein the first slot element has a first order mode configured to radiate in the first frequency band, the third frequency band, the fourth frequency band, and a fifth frequency band at frequencies between the first and fourth frequency bands.

10. The electronic device defined in claim 9, wherein the first frequency band comprises a cellular ultra-high band between 3400 and 3800 MHz, the second frequency band comprises a 5 GHz wireless local area network band, the third frequency band comprises a cellular high band between 2300 and 2700 MHz, the fourth frequency band comprises a cellular midband between 1700 and 2200 MHz, and the fifth frequency band comprises a 2.4 GHz wireless local area network band.

11. The electronic device defined in claim 6, further comprising:
a first tunable component coupled across the second slot element, wherein the first tunable component is configured to tune the first order mode of the second slot element without tuning the third order mode of the second slot element; and
a second tunable component coupled across the third slot element, wherein the second tunable component is configured to tune the first order mode of the third slot element without tuning the third order mode of the third slot element.

12. An electronic device comprising:
a housing having peripheral conductive housing structures and a conductive wall, wherein the peripheral conductive housing structures comprise first, second, and third conductive sidewalls, the second conductive sidewall extending from the first conductive sidewall to the third conductive sidewall;
a first dielectric gap in the first conductive sidewall that divides the peripheral conductive housing structures into first and second segments;
a second dielectric gap in the second conductive sidewall that separates the second segment from a third segment of the peripheral conductive housing structures;
a third dielectric gap in the second conductive sidewall that separates the third segment from a fourth segment of the peripheral conductive housing structures;
a fourth dielectric gap in the third dielectric sidewall that separates the fourth segment from a fifth segment of the peripheral conductive housing structures;
a first antenna having a first resonating element arm formed from the second segment, the second segment being separated from the conductive wall by a first slot that extends from the first dielectric gap to the second dielectric gap; and
a second antenna having a second resonating element arm formed from the fourth segment, the fourth segment being separated from the conductive wall by a second slot that extends from the third dielectric gap to the fourth dielectric gap.

13. The electronic device defined in claim 12, further comprising:
a conductive bridging structure that couples the third segment to the conductive wall, wherein the conductive bridging structure electrically isolates the first and second slots, the second slot has an extension that is interposed between the third segment and the conductive wall, and the extension is configured to perform impedance matching for the second antenna.

14. The electronic device defined in claim 12, further comprising:
a first antenna feed coupled to the second segment;
a first tunable component coupled to the second segment at a point between the first dielectric gap and the first antenna feed;
a second tunable component coupled to the second segment at a point between the second dielectric gap and the first antenna feed; and
a third tunable component coupled to the second segment at a point between the second tunable component and the second dielectric gap, wherein the third tunable component is configured to tune a frequency response of the first antenna in a first frequency band, the second tunable component is configured to tune a frequency response of the first antenna in a second frequency band at higher frequencies than the first frequency band, the third tunable component is configured to tune a frequency response of the first antenna in a third frequency band at higher frequencies than the second frequency band, and a harmonic mode of the second segment is configured to radiate in a fourth frequency band at higher frequencies than the third frequency band.

15. The electronic device defined in claim 14, further comprising:
a second antenna feed coupled to the fourth segment;
a fourth tunable component coupled to the fourth segment at a point between the fourth dielectric gap and the second antenna feed;
a fifth tunable component coupled to the fourth segment at a point between the third dielectric gap and the second antenna feed; and
a sixth tunable component coupled to the fourth segment at a point between the fifth tunable component and the third dielectric gap, wherein the sixth tunable component is configured to tune a frequency response of the second antenna in the first frequency band, the fifth tunable component is configured to tune a frequency response of the second antenna in the second frequency band, the sixth tunable component is configured to tune a frequency response of the second antenna in the third frequency band, a harmonic mode of the fourth segment is configured to radiate in the fourth frequency band, and a portion of the fourth segment extending from the second antenna feed to the fourth tunable component is configured to radiate in a fifth frequency band at higher frequencies than the second frequency band and at lower frequencies than the fourth frequency band.

16. The electronic device defined in claim 15, wherein the first frequency band comprises a cellular low band between 900 and 960 MHz, the second frequency band comprises a cellular midband between 1700 and 2200 MHz, the third frequency band comprises a cellular high band between 2300 and 2700 MHz, the fourth frequency band comprises a cellular ultra-high band between 3400 and 3800 MHz, and the fifth frequency band comprises a 2.4 GHz wireless local area network band.

17. An electronic device having opposing first and second ends, comprising:
peripheral conductive housing structures that include a first conductive sidewall at the first end and a second conductive sidewall at the second end;
a conductive housing wall;
a display mounted to the peripheral conductive housing structures;

a display controller at the second end of the electronic device and configured to control pixel circuitry in the display;

first and second antennas at the first end of the electronic device and comprising respective first and second slots with edges defined by the conductive housing wall and the first conductive sidewall; and third, fourth, fifth, and sixth antennas at the second end of the electronic device and comprising respective third, fourth, fifth, and sixth slots having edges defined by the conductive housing wall and the second conductive sidewall.

18. The electronic device defined in claim 17, wherein:

the first and second antennas are configured to convey radio-frequency signals in a first frequency band, a second frequency band at higher frequencies than the first frequency band, a third frequency band at higher frequencies than the second frequency band, and a fourth frequency band at higher frequencies than the third frequency band;

the second antenna is configured to receive radio-frequency signals in a fifth frequency band at higher frequencies than the first frequency band and lower frequencies than the second frequency band;

the second antenna is configured to convey radio-frequency signals in a sixth frequency band at higher frequencies than the second frequency band and lower frequencies than the fourth frequency band;

the third antenna is configured to convey radio-frequency signals in the second, third, fourth, and sixth frequency bands;

the fourth antenna is configured to convey radio-frequency signals in the fourth frequency band and a seventh frequency band at higher frequencies than the fourth frequency band;

the fifth antenna is configured to convey radio-frequency signals in the fourth and seventh frequency bands; and the sixth antenna is configured to convey radio-frequency signals in the second, third, and seventh frequency bands.

19. The electronic device defined in claim 18, wherein the first, second, third, and sixth antennas are configured to perform four stream (4×) multiple-input and multiple-output (MIMO) operations in the second and third frequency bands, and the first, second, fourth, and fifth antennas are configured to perform 4×MIMO operations in the fourth frequency band.

20. The electronic device defined in claim 19, wherein the first frequency band comprises a cellular low band between 600 and 960 MHz, the second frequency band comprises a cellular midband between 1700 and 2200 MHz, the third frequency band comprises a cellular high band between 2300 and 2700 MHz, the fourth frequency band comprises a cellular ultra-high band between 3400 and 3800 MHz, the fifth frequency band comprises a global positioning system (GPS) band between 1565 and 1610 MHz, the sixth frequency band comprises a 2.4 GHz wireless local area network band between 2400 and 2480 MHz, and the seventh frequency band comprises a 5 GHz wireless local area network band between 5180 and 5825 MHz.

\* \* \* \* \*